United States Patent
Takeo

(10) Patent No.: US 10,060,096 B2
(45) Date of Patent: Aug. 28, 2018

(54) SHOVEL

(71) Applicant: SUMITOMO (S.H.I.) CONSTRUCTION MACHINERY CO., LTD., Tokyo (JP)

(72) Inventor: Jitsutaka Takeo, Chiba (JP)

(73) Assignee: SUMITOMO (S.H.I.) CONSTRUCTION MACHINERY CO., LTD., Tokyo (JP)

( * ) Notice: Subject to any disclaimer, the term of this patent is extended or adjusted under 35 U.S.C. 154(b) by 217 days.

(21) Appl. No.: 15/228,906

(22) Filed: Aug. 4, 2016

(65) Prior Publication Data
US 2016/0340870 A1 Nov. 24, 2016

Related U.S. Application Data

(63) Continuation of application No. PCT/JP2015/056722, filed on Mar. 6, 2015.

(30) Foreign Application Priority Data

Mar. 6, 2014 (JP) ................................. 2014-044240
Mar. 31, 2014 (JP) ................................. 2014-074526

(51) Int. Cl.
*E02F 9/02* (2006.01)
*E02F 9/20* (2006.01)
(Continued)

(52) U.S. Cl.
CPC ............ *E02F 9/2095* (2013.01); *B60K 6/485* (2013.01); *B60K 6/54* (2013.01); *B60L 1/003* (2013.01);
(Continued)

(58) Field of Classification Search
CPC ....... B60W 10/26; E92F 9/207; E92F 9/2075; E92F 9/2091
(Continued)

(56) References Cited

U.S. PATENT DOCUMENTS 5,957,235 A * 9/1999 Nishimura ........... B60K 17/043
                                                            180/306
6,666,022 B1 * 12/2003 Yoshimatsu ............. B60K 6/46
                                                            60/413
(Continued)

FOREIGN PATENT DOCUMENTS

EP    1720244 A1    11/2006
EP    2374945 A1    10/2011
(Continued)

OTHER PUBLICATIONS

PCT International Search Report and Written Opinion, PCT Application No. PCT/JP2015/056722, dated May 26, 2015, 9 pages (with English translation of search report).
(Continued)

*Primary Examiner* — Jeffrey J Restifo
(74) *Attorney, Agent, or Firm* — Fenwick & West LLP

(57) ABSTRACT

A shovel according to embodiments of the present invention includes a lower travelling body, an upper swivel body, an operation attachment, an engine, a motor generator which is connected to the engine, a hydraulic pump which is connected to the motor generator and supplies hydraulic oil to the operation attachment, a swiveling electric motor which is mounted on the upper swivel body, a power storage device, a DC bus which electrically connects the power storage device and the swiveling electric motor to each other, and a control device, in which the control device decreases a charging/discharging limit value of the power storage device and changes a discharging requirement value which is the maximum value of power which is supplied from the power storage device to the swiveling electric motor, according to a decrease of temperature.

14 Claims, 24 Drawing Sheets

(51) Int. Cl.
| | |
|---|---|
| *B60K 6/485* | (2007.10) |
| *B60K 6/54* | (2007.10) |
| *B60W 10/26* | (2006.01) |
| *B60W 20/00* | (2016.01) |
| *E02F 9/12* | (2006.01) |
| *B60L 1/00* | (2006.01) |
| *B60L 7/14* | (2006.01) |
| *B60L 11/00* | (2006.01) |
| *B60L 11/18* | (2006.01) |
| *E02F 3/32* | (2006.01) |
| *H02J 7/14* | (2006.01) |
| *E02F 9/22* | (2006.01) |

(52) U.S. Cl.
CPC .............. *B60L 7/14* (2013.01); *B60L 11/005* (2013.01); *B60L 11/1862* (2013.01); *B60L 11/1875* (2013.01); *B60W 10/26* (2013.01); *B60W 20/00* (2013.01); *E02F 3/32* (2013.01); *E02F 9/123* (2013.01); *E02F 9/2091* (2013.01); *H02J 7/14* (2013.01); *B60L 2200/40* (2013.01); *B60L 2210/12* (2013.01); *B60L 2210/14* (2013.01); *B60L 2240/36* (2013.01); *B60L 2240/545* (2013.01); *B60L 2240/547* (2013.01); *E02F 9/2075* (2013.01); *E02F 9/2296* (2013.01); *Y02T 10/705* (2013.01); *Y02T 10/7005* (2013.01); *Y02T 10/7022* (2013.01); *Y02T 10/7044* (2013.01); *Y02T 10/7225* (2013.01); *Y02T 10/7233* (2013.01); *Y10S 903/903* (2013.01)

(58) Field of Classification Search
USPC ........................................ 180/305, 306, 307
See application file for complete search history.

(56) References Cited

U.S. PATENT DOCUMENTS

| | | | | |
|---|---|---|---|---|
| 7,069,673 | B2 * | 7/2006 | Kagoshima | B60K 6/12 37/348 |
| 7,279,801 | B2 * | 10/2007 | Kagoshima | B60K 6/46 180/312 |
| 7,525,206 | B2 | 4/2009 | Kagoshima et al. | |
| 8,362,786 | B2 * | 1/2013 | Yamane | B60W 20/13 324/537 |
| 8,571,735 | B2 * | 10/2013 | Koga | E02F 9/2058 701/22 |
| 8,639,422 | B2 * | 1/2014 | Ota | E02F 9/2075 701/22 |
| 8,798,875 | B2 * | 8/2014 | Yanagisawa | B60K 6/365 701/50 |
| 8,818,648 | B2 * | 8/2014 | Takanashi | E02F 9/2025 180/65.21 |
| 8,942,872 | B2 | 1/2015 | Kawasaki et al. | |
| 9,045,044 | B2 * | 6/2015 | Murakami | B60W 10/06 290/40 D |
| 9,181,683 | B2 * | 11/2015 | Doi | H01M 10/625 |
| 9,187,294 | B2 * | 11/2015 | Sakamoto | E02F 9/123 |
| 9,206,584 | B2 * | 12/2015 | Kawaguchi | B60L 3/0046 |
| 9,212,468 | B2 * | 12/2015 | Sugiyama | E02F 9/2091 |
| 9,243,384 | B2 * | 1/2016 | Yamashita | B60W 10/26 |
| 9,487,932 | B2 * | 11/2016 | Ishihara | B60L 11/14 |
| 9,540,790 | B2 * | 1/2017 | Ishihara | E02F 9/2075 |
| 9,550,413 | B2 * | 1/2017 | Take | F02D 41/0205 |
| 9,556,591 | B2 * | 1/2017 | Shang | E02F 9/2217 |
| 9,605,410 | B2 * | 3/2017 | Kitamura | E02F 9/123 |
| 9,611,624 | B2 * | 4/2017 | Takeuchi | H01M 2/1083 |
| 9,617,714 | B2 * | 4/2017 | Ishihara | E02F 9/2075 |
| 9,702,116 | B2 * | 7/2017 | Takeo | E02F 9/2091 |
| 9,725,008 | B2 * | 8/2017 | Wu | B60L 11/187 |
| 9,726,205 | B2 * | 8/2017 | Doi | F15B 21/08 |
| 9,745,723 | B2 * | 8/2017 | Inoue | E02F 9/26 |
| 9,802,600 | B2 * | 10/2017 | Nanjo | B60K 6/485 |
| 9,809,958 | B2 * | 11/2017 | Shang | E02F 9/2217 |
| 9,863,124 | B2 * | 1/2018 | Ishihara | E02F 9/2075 |
| 9,873,349 | B2 * | 1/2018 | Doi | B60L 11/187 |
| 9,889,750 | B2 * | 2/2018 | Yunoue | B60L 11/1801 |
| 2007/0187180 | A1 * | 8/2007 | Kagoshima | B60K 6/12 182/232 |
| 2011/0093150 | A1 * | 4/2011 | Yanagisawa | B60K 6/365 701/22 |
| 2013/0035820 | A1 * | 2/2013 | Kawasaki | B60L 3/0046 701/22 |
| 2013/0253781 | A1 * | 9/2013 | Li | B60L 8/003 701/50 |
| 2013/0299256 | A1 * | 11/2013 | Yamashita | E02F 9/2095 180/68.1 |
| 2013/0311052 | A1 * | 11/2013 | Edamura | E02F 9/123 701/50 |
| 2014/0067176 | A1 * | 3/2014 | Goto | E02F 9/2075 701/22 |
| 2014/0277970 | A1 * | 9/2014 | Sakamoto | E02F 9/123 701/50 |
| 2015/0025726 | A1 * | 1/2015 | Yamashita | B60W 10/26 701/22 |

FOREIGN PATENT DOCUMENTS

| | | |
|---|---|---|
| EP | 2669440 A1 | 12/2013 |
| JP | 2000 040532 A | 2/2000 |
| JP | 2005-237178 A | 9/2005 |
| JP | 2007 228721 A | 9/2007 |
| JP | 2010-127271 A | 6/2010 |
| JP | 2011-241539 A | 12/2011 |

OTHER PUBLICATIONS

European Extended Search Report, European Application No. 15759073.8, dated Sep. 6, 2017, 8 pages.

* cited by examiner

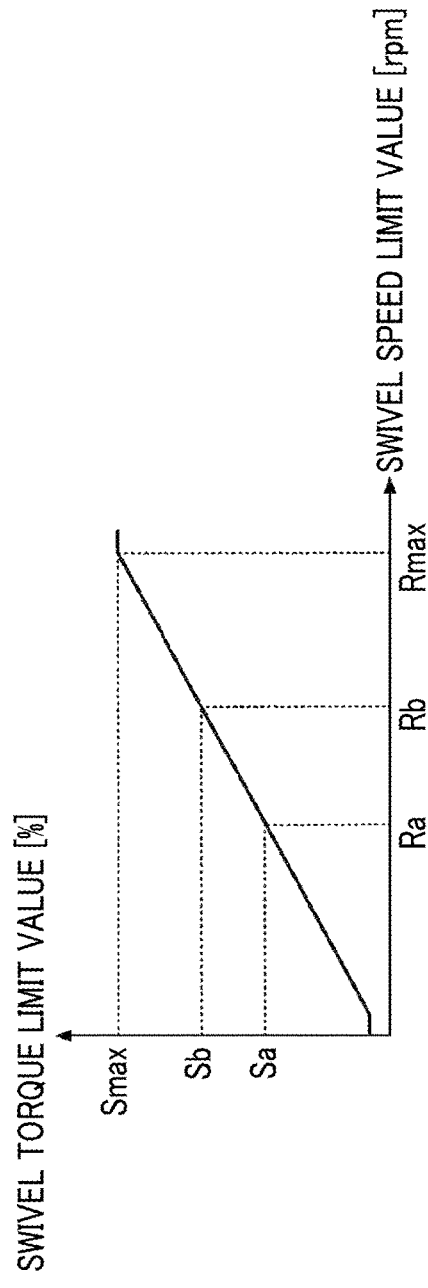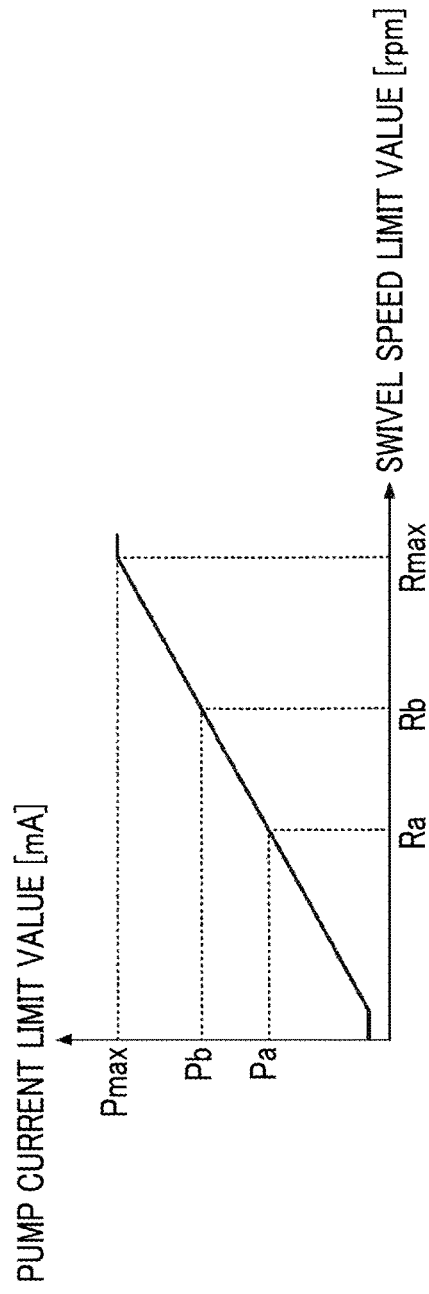

SHOVEL

CROSS REFERENCE TO RELATED APPLICATIONS

This application is a continuation of PCT Application No. PCT/JP2015/056722 filed on Mar. 6, 2015 which claims priority to Japanese Patent Application No. 2014-044240 filed on Mar. 6, 2014 and Japanese Patent Application No. 2014-074526 filed on Mar. 31, 2014, which are incorporated by reference herein in their entirety.

BACKGROUND

Technical Field

Certain embodiments of the present invention relate to a shovel which includes a swiveling electric motor and a power storage system.

Description of Related Art

In the related art, a hybrid construction machine is known, which includes a motor generator which is connected to a battery, a hydraulic motor which is rotated by oil which is returned from a swiveling hydraulic motor, a main pump for driving an engine, and an assist pump which assists the main pump. In the hybrid construction machine, power is generated by oil which is returned from the swiveling hydraulic motor when swiveling stops and the generated power is charged into the battery.

SUMMARY

According to an embodiment of the present invention, there is provided a shovel including: a lower travelling body; an upper swivel body; an operation attachment; an engine; a motor generator which is connected to the engine; a hydraulic pump which is connected to the motor generator and supplies hydraulic oil to the operation attachment; a swiveling electric motor which is mounted on the upper swivel body; a power storage device; a DC bus which electrically connects the power storage device and the swiveling electric motor to each other; and a control device, in which the control device decreases a charging/discharging limit value of the power storage device and changes a discharging requirement value which is the maximum value of power which is supplied from the power storage device to the swiveling electric motor, according to a decrease of temperature.

BRIEF DESCRIPTION OF THE DRAWINGS

FIGS. 13A and 13B are diagrams showing a relationship between the swivel speed limit value and a swivel torque limit value and a relationship between the swivel speed limit value and a pump current limit value.

DETAILED DESCRIPTION

In the related art, an electric braking force cannot be obtained if regenerative power generation is suppressed.

Accordingly, it is desirable to provide a shovel which includes a swiveling electric motor and a power storage system capable of being appropriately operated even at a low temperature.

According to embodiments of the present invention, it is possible to provide a shovel which includes a swiveling electric motor and a power storage system capable of being appropriately operated even at a low temperature.

Figure 1:
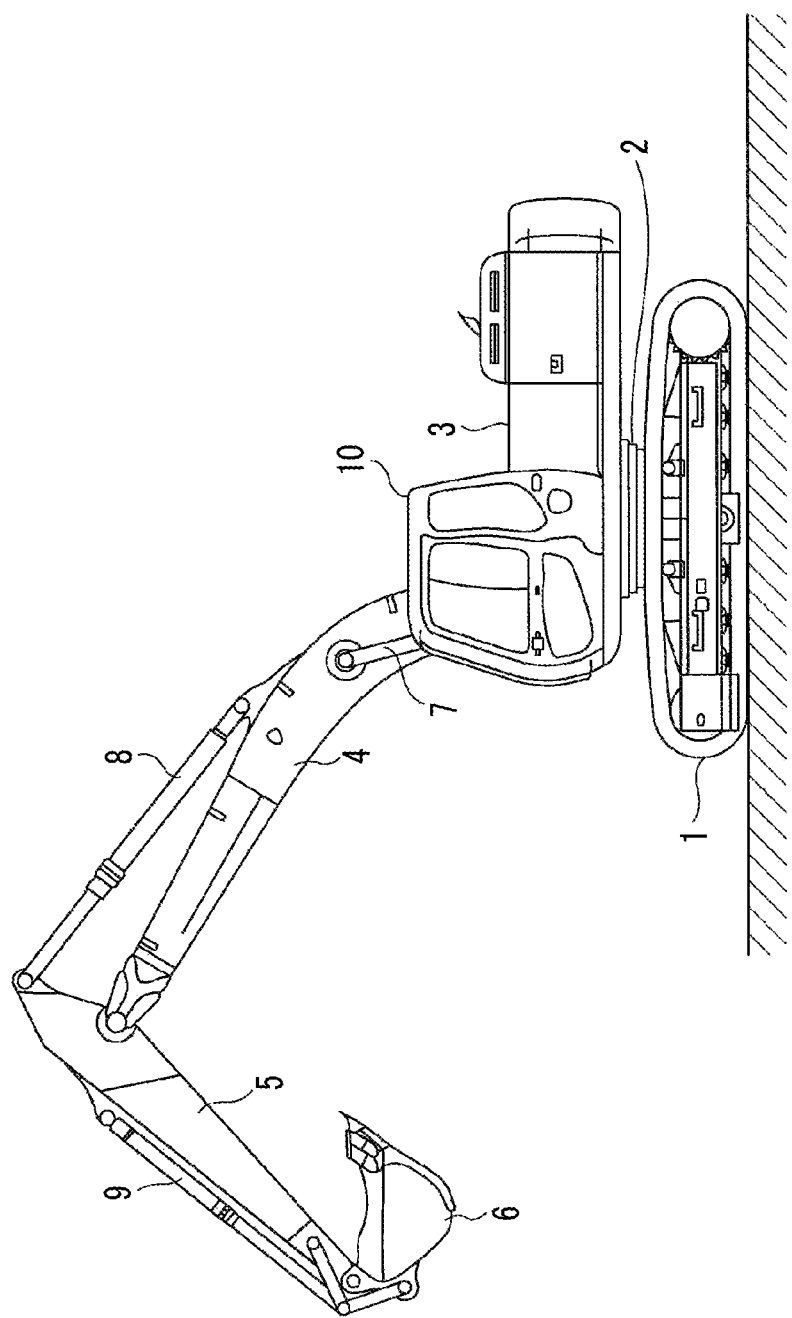
FIG. 1 is a side view of a shovel.

FIG. 1 is a side view showing a shovel which is an example of a construction machine to which the present invention is applied. An upper swivel body 3 is mounted on a lower travelling body 1 of the shovel via a swivel mechanism 2. A boom 4 is attached to the upper swivel body 3. An arm 5 is attached to the distal end of the boom 4, and a bucket 6 is attached to the distal end of the arm 5. The boom 4, the arm 5, and the bucket 6 configures an excavator attachment which is an example of an operation attachment, and are respectively driven hydraulically by a boom cylinder 7, an arm cylinder 8, and a bucket cylinder 9. A cabin 10 is provided on the upper swivel body 3, and a drive source such as an engine is mounted on the upper swivel body 3.

Figure 2:
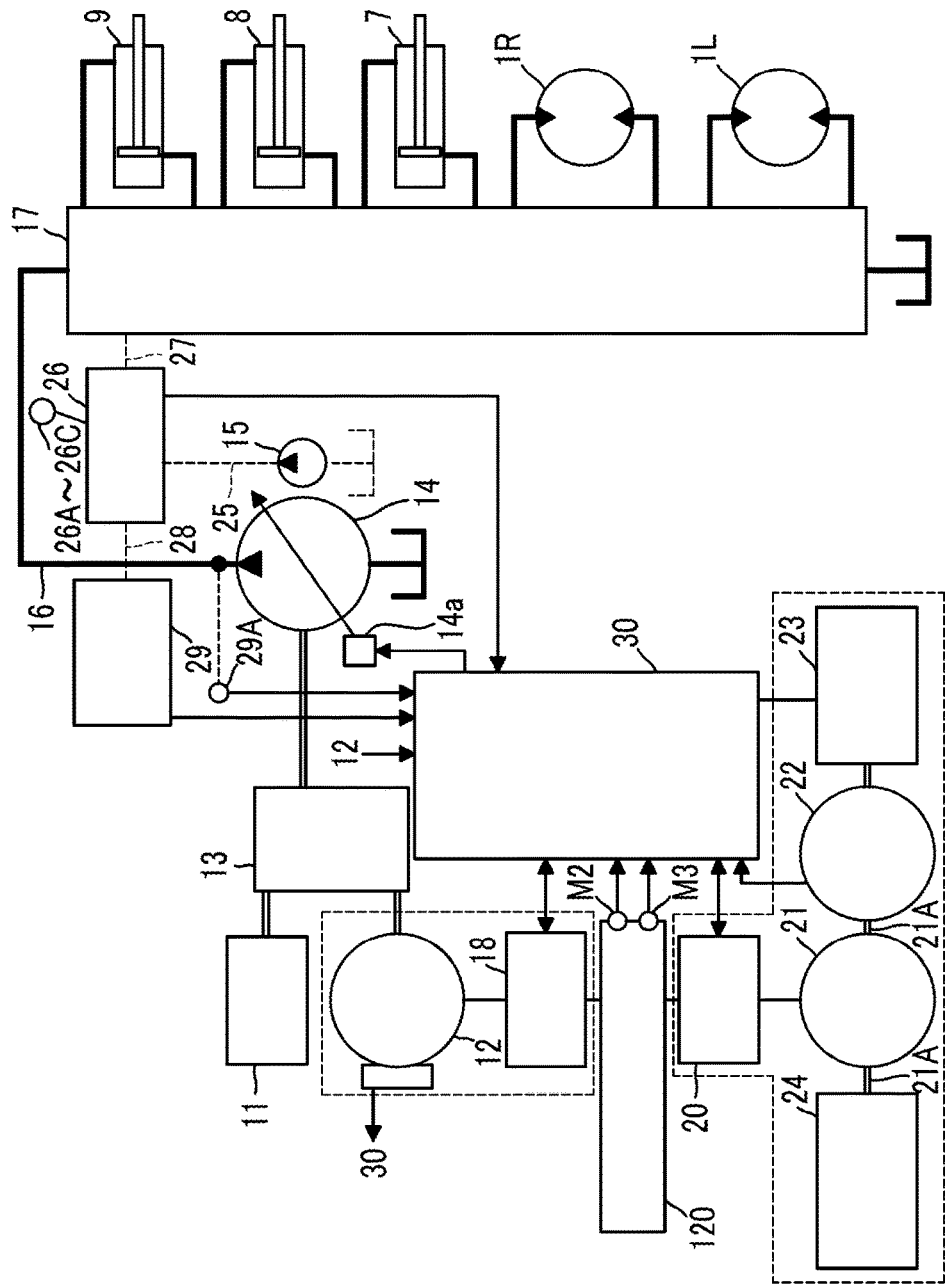
FIG. 2 is a block diagram showing a configuration of a drive system of the shovel of FIG. 1.

FIG. 2 is a block diagram showing a configuration example of a drive system of the shovel according to the embodiment of the present invention. In FIG. 2, a mechanical drive system is indicated by double lines, a high pressure hydraulic line is indicated by thick solid lines, a pilot line is indicated by broken lines, and an electric drive and control system is indicated by thin solid lines.

Each of an engine 11 serving as a mechanical drive section and a motor generator 12 serving as an assist drive section is connected to each of two input shafts of a transmission 13. A main pump 14 and a pilot pump 15 which are hydraulic pumps are connected to an output shaft of the transmission 13. A control valve 17 is connected to the main pump 14 via a high pressure hydraulic line 16. The main pump 14 and each nozzle inside the control valve 17 may be connected to each other in parallel.

The main pump 14 is a component of the hydraulic drive system in the shovel, and is a swash plate variable capacity type hydraulic pump in the present embodiment.

A regulator 14a is a device which controls an ejection amount of the main pump 14. In the present embodiment, the regulator 14a adjusts a swash plate tilt angle of the main pump 14 according to a command from a controller 30 to control the ejection amount of the main pump 14.

The control valve 17 is a hydraulic control device which controls a hydraulic system in the shovel. A hydraulic actuator such as a right travelling hydraulic motor 1R, a left travelling hydraulic motor 1L, the boom cylinder 7, the arm cylinder 8, or the bucket cylinder 9 is connected to the control valve 17 via the high pressure hydraulic line. In addition, the hydraulic system includes the right travelling hydraulic motor 1R, the left travelling hydraulic motor 1L, the boom cylinder 7, the arm cylinder 8, the bucket cylinder 9, the main pump 14, and the control valve 17.

A power storage system 120 including a capacitor serving as a power storage device is connected to the motor generator 12 via an inverter 18 serving as a motor generator control unit. In addition, a swiveling electric motor 21 serving as a motor-driven operation element is connected to the power storage system 120 via an inverter 20 serving as a motor generator control unit. A resolver 22, a mechanical brake 23, and a swivel transmission 24 are connected to rotary shafts 21A of the swiveling electric motor 21. Moreover, an operation device 26 is connected to the pilot pump 15 via a pilot line 25. The swiveling electric motor 21, the inverter 20, the resolver 22, the mechanical brake 23, and the swivel transmission 24 configure an electrical swivel system which is a load drive system. The swiveling electric motor 21 has a function of a swivel driving and rotates the upper swivel body 3. The swivel system may be configured to include a hydraulic driving and braking system. In the present embodiment, particularly, remarkable effects are exerted by a configuration which does not use hydraulic configurations for performing swivel driving. Hereinafter, the configuration which does not use the hydraulic configurations for performing swivel driving will be described.

The operation device 26 generates information related to an operation amount. The information is not inverted or is inverted, and the information is directly supplied to or indirectly supplied via the controller 30 or the like to a drive device or other devices. The operation device 26 includes a lever 26A, a lever 26B, and a pedal 26C. The lever 26A, the lever 26B, and the pedal 26C are connected to each of the control valve 17 and a pressure sensor 29 via hydraulic lines 27 and 28.

The pressure sensor 29 is a sensor which detects an operation content of the operation device 26 as a pressure, and outputs the detection value to the controller 30.

The ejection pressure sensor 29A is a sensor which detects the ejection pressure of the main pump 14, and outputs the detection value to the controller 30.

Temperature sensors M2 and M3 are sensors which detect the temperature of the power storage system 120, and output the detection value to the controller 30. In the present embodiment, each of the temperature sensors M2 and M3 is configured of a thermistor, and outputs the detection value to the controller 30.

The controller 30 is a control device which is a main control unit which controls driving of the shovel. In the present embodiment, the controller 30 is configured of a calculation processing device including a CPU and an internal memory, and carries out programs for driving and control stored in the internal memory by the CPU to realize various functions.

In addition, for example, the controller 30 receives the detection values from the pressure sensor 29, the ejection pressure sensor 29A, the temperature sensor M2, and the temperature sensor M3 to perform various calculations, and outputs various commands to the engine 11, the regulator 14a, the power storage system 120, or the like. For example, the controller 30 starts warming-up of the power storage system 120 in a case where it is determined that the temperature of the power storage system 120 is less than a predetermined temperature based on the detection value of the temperature sensor M2. In addition, the controller 30 continues the warming-up of the power storage system 120 even in a case where it is determined that the warming-up of the hydraulic drive system has started based on the detection values of the pressure sensor 29 and the ejection pressure sensor 29A. Moreover, descriptions with respect to the warming-up of the hydraulic drive system and the warming-up of the power storage system 120 will be described in detail below.

Figure 3:
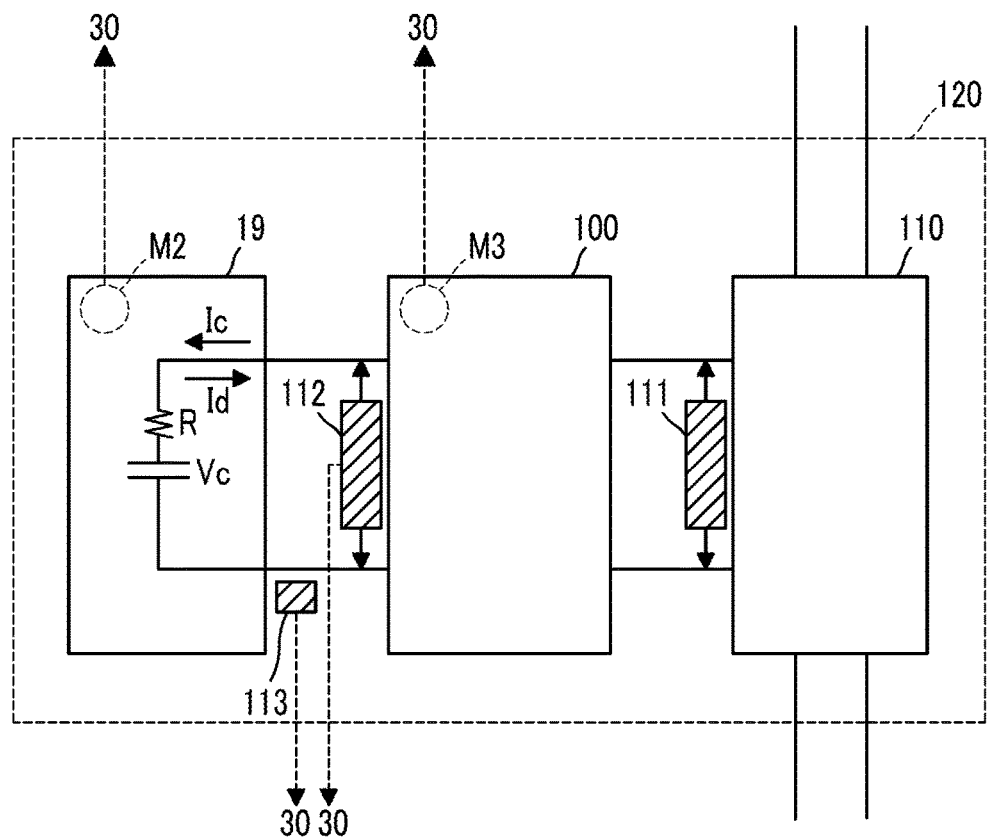
FIG. 3 is a block diagram showing a configuration of a power storage system.

FIG. 3 is a block diagram showing the configuration of the power storage system 120. The power storage system 120 includes a capacitor 19 serving as a first power storage device, a step-up/step-down converter 100, and a DC bus 110 serving as a bus line. In addition, the first power storage device is a device which can charge and discharge power, and for example, includes a lithium ion capacitor, an electric double-layer capacitor, a lithium ion battery, or the like. In the present embodiment, the capacitor 19 is a lithium ion capacitor.

A capacitor voltage detecting unit 112 for detecting a capacitor voltage value, and a capacitor current detecting unit 113 for detecting a capacitor current value are provided in the power storage system 120. The capacitor voltage value and the capacitor current value are supplied to the controller 30.

The capacitor voltage value is equivalent to a terminal voltage of the capacitor 19. If an open voltage of the capacitor 19 is defined as Vc [V], an internal resistance of the capacitor 19 is defined as R [Ω], and a magnitude of a discharging current which flows from the capacitor 19 to the step-up/step-down converter 100 is defined as Id [A], a terminal voltage V1 at the time of discharging of the capacitor 19 is represented by V1=Vc−R×Id, and discharging power W1 of the capacitor 19 is represented by W1=V1×Id. In addition, if a magnitude of a charging current which flows the step-up/step-down converter 100 to the capacitor 19 is defined as Ic, a terminal voltage V2 at the time of charging of the capacitor 19 is represented by V2=Vc+R×Ic, and charging power W2 of the capacitor 19 is represented by W2=V2×Ic.

In addition, a heating value Q1 at the time of discharging of the capacitor 19 is represented by Id2×R, and a heating value Q2 at the time of charging is represented by Ic2×R.

Moreover, if the minimum voltage of the capacitor 19 is defined as Vmin and the maximum voltage thereof is defined as Vmax, a state-of-charge (SOC) of the capacitor 19 is represented by the following Expression.

$$SOC = \frac{Vc^2 - V\min^2}{V\max^2 - V\min^2} \times 100 [\%] \quad \text{[Expression 1]}$$

From the above-described relationships, the SOC of the capacitor 19 increasing means that the open voltage Vc increases and in a case where a predetermined discharging power W1 is realized, since the heating value Q1 at the time of discharging decreases as the discharging current Id decreases, discharging efficiency increases. Similarly, in a case where a predetermined charging power W2 is realized, since the heating value Q2 at the time of charging decreases as the charging current Ic decreases, discharging efficiency increases.

In addition, the temperature sensor M2 which is provided in the power storage system 120 detects the temperature (capacitor temperature) of the capacitor 19. The temperature sensor M3 detects the temperature of the step-up/step-down converter 100. The capacitor temperature may be detected according to a method in which a relative value with respect to an appropriate reference of the temperature of the capacitor 19 is understood, and generally, the capacitor temperature is directly measured. Information related to the capacitor temperature may be used. For example, the capacitor temperature may be indirectly detected by detecting the temperature of a cooling water which is used to cool the capacitor 19. Moreover, the capacitor temperature may be indirectly detected by detecting the temperatures of other heat media which influence the temperature of the capacitor 19 in addition to the cooling water. An ambient temperature such as an atmospheric temperature may be used. For example, the temperature sensor M2 is configured of a thermistor which is attached to an electrode of a capacitor cell, and outputs the detection value to the controller 30.

The step-up/step-down converter 100 controls switching between a step-up operation and a step-down operation such that a DC bus voltage value is within a predetermined range according to operation states of the motor generator 12 and the swiveling electric motor 21. In addition, the voltage of the DC bus 110 is detected by a DC bus voltage detecting unit 111. The DC bus 110 is disposed between each of the inverters 18 and 20 and the step-up/step-down converter 100, and transmits and receives power among the capacitor 19, the motor generator 12, and the swiveling electric motor 21.

The controller 30 converts signals supplied from the pressure sensor 29 into speed commands, and controls driving of the swiveling electric motor 21. In this case, the signals supplied from the pressure sensor 29 are equivalent to signals which indicate the operation amount in a case where the operation device 26 is operated to swivel the swivel mechanism 2.

In addition, the controller 30 performs an operation control (switching between a motor-driven (assist) operation and a power-generation operation) of the motor generator 12, and performs charging and discharging controls of the capacitor 19 by controlling the driving of the step-up/step-down converter 100. Specifically, the controller 30 performs charging and discharging controls of the capacitor 19 according to the charging state of the capacitor 19, the operation state (assist operation or power-generation operation) of the motor generator 12, and the operation state (power-running operation or regenerative operation) of the swiveling electric motor 21.

In the control of the step-up/step-down converter 100, the DC bus voltage value, the capacitor voltage value, and the capacitor current value are considered.

In the above-described configuration, after the power generated by the motor generator 12 serving as an assist motor is supplied to the DC bus 110 via the inverter 18, the power can be supplied to the capacitor 19 via the step-up/step-down converter 100 or supplied to the swiveling electric motor 21 via the inverter 20. In addition, after the regenerative power is generated by the regenerative operation of the swiveling electric motor 21 is supplied to the DC bus 110 via the inverter 20, the regenerative power can be supplied to the capacitor 19 via the step-up/step-down converter 100 or can be supplied to the motor generator 12 via the inverter 18. The power accumulated in the capacitor 19 can be supplied to at least one of the motor generator 12 and the swiveling electric motor 21 via the step-up/step-down converter 100 and the DC bus 110.

In the shovel having the above-described configuration, the controller 30 charges and discharges the capacitor 19 such that the capacitor 19 can maintain or easily maintains a predetermined state-of-charge (SOC). If the predetermined SOC is changed to an appropriate range according to an environment surrounding the capacitor 19, there are advantages described below. Even when power is exchanged between the various electric loads or is received therefrom by the capacitor 19, at least the capacitor 19 is maintained within a range in which overcharging or overdischarging does not occur. Accordingly, as application of the SOC, the SOC of the capacitor 19 may be maintained to a predetermined SOC level (for example, 70%). Higher energy can be obtained as this level increases. Meanwhile, as described below, in a case where the ambient temperature is low and the temperature of the capacitor 19 is low, a relatively low level may be preferable.

In addition, an "object of the capacitor 19 other than charging" includes intentionally applying a load to the engine 11. In addition, by allowing the motor generator 12 to function as a generator at an arbitrary timing and intentionally applying a load to the engine 11, the controller 30 can increase the output of the engine 11 at an arbitrary timing. This is because the engine 11 maintains a predetermined rotating speed in a case where a load increases such that the output increases. Accordingly, the controller 30 instantaneously increases the output of the engine 11 before a hydraulic load is applied to the engine 11, and it is possible to prevent the rotating speed of the engine 11 from decreasing due to shortage in output when the hydraulic load is actually applied.

The SOC of the capacitor 19 is calculated based on the capacitor voltage value. The SOC may be derived by measuring the internal resistance of the capacitor 19, and may be derived using other known arbitrary methods.

The controller 30 determines a charging requirement value and a discharging requirement value based on a current value of the SOC of the capacitor 19, and controls the charging and discharging of the capacitor 19. The controller 30 causes the motor generator 12 to generate power (the power generation may be performed to generate the power or more) equivalent to the charging requirement value, and charges the capacitor 19 by the power equivalent to the charging requirement value. The charging requirement value may be changed according to the current SOC, and the states of the electric motor and the generator. In a case where the charging requirement value is zero, the capacitor 19 is not charged. Meanwhile, the motor generator 12 functioning as a generator for other objects is not prohibited.

In addition, in a case where the swiveling electric motor 21 performs a power-running operation, the controller 30 discharges (the power less than or equal to the discharging requirement value may be discharged if the power required for swivel or assist is low) the power of the capacitor 19 based on the discharging requirement value. The discharging requirement value may be changed according to the current SOC, and the states of the electric motor and the generator. If the output [kW] required for driving the swiveling electric motor 21 is greater than the power equivalent to the discharging requirement value, the motor generator 12 functions as the generator. This is because the swiveling electric motor 21 is driven by the power generated by the motor generator 12 and the power discharged by the capacitor 19. In addition, in a case where the discharging requirement value is zero, the controller 30 does not discharge the capacitor 19.

Figure 4:
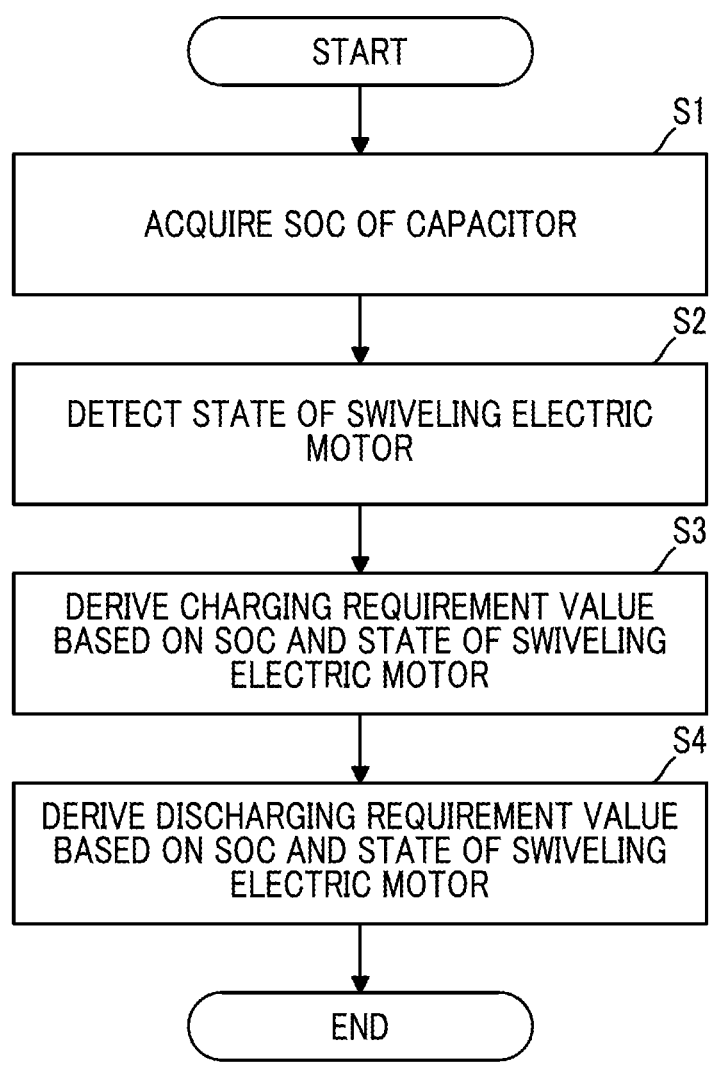
FIG. 4 is a flowchart showing a flow of requirement value deriving processing.

Here, with reference to FIG. 4, processing (hereinafter, referred to as "requirement value deriving processing") for the controller 30 deriving the charging requirement value and the discharging requirement value based on the SOC of the capacitor 19 will be described. In addition, FIG. 4 is a flowchart showing the flow of the requirement value deriving processing, and the controller 30 repeatedly performs the requirement value deriving processing at a predetermined control period.

First, the controller 30 acquires the SOC of the capacitor 19 (Step S1).

In addition, the controller 30 detects the state of the swiveling electric motor 21 (Step S2). An operation state and a stop state of the swiveling electric motor 21 are determined from the swivel speed which is calculated based on the output of the resolver 22. A power-running operation state and a regeneration operation state of the swiveling electric motor 21 are determined from swivel torque which is calculated based on the current flowing through the inverter 20 and the swivel speed.

In addition, Step S1 and Step S2 are in no particular order, the controller 30 may acquire the SOC of the capacitor 19 after detecting the state of the swiveling electric motor 21, and the controller 30 may simultaneously perform two processing.

Thereafter, the controller 30 derives the charging requirement value based on the SOC of the capacitor 19 and the state of the swiveling electric motor 21 (Step S3). In this case, a SOC/requirement value correspondence table which is stored in the internal memory may be referred.

In addition, the discharging requirement value is derived based on the SOC of the capacitor 19 and the state of the swiveling electric motor 21 (Step S4). In the present embodiment, the controller 30 may refer the SOC/requirement value correspondence table which is used in the case where the charging requirement value is derived.

Figure 5:
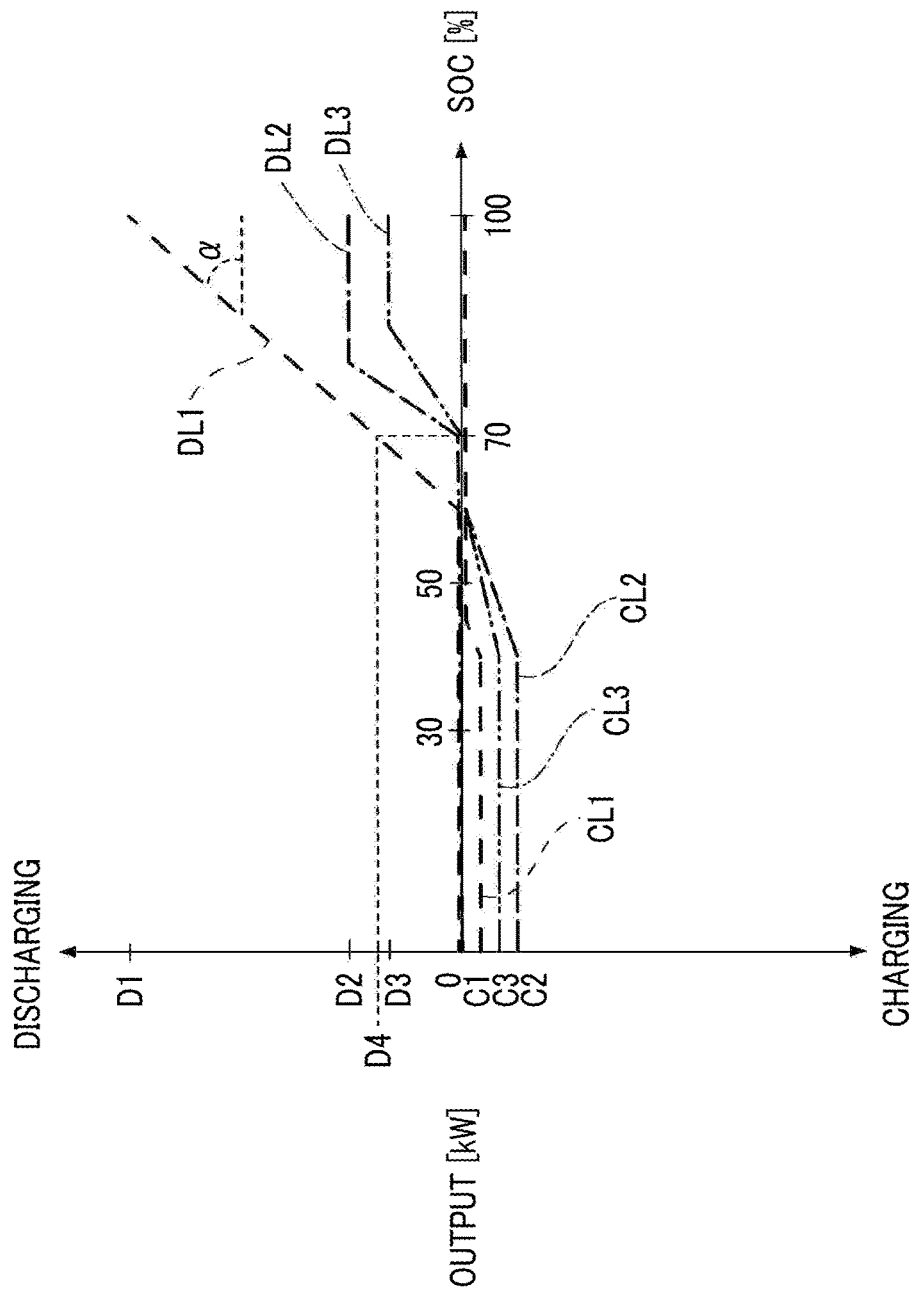
FIG. 5 is a diagram explaining an example of a SOC/requirement value correspondence table.

FIG. 5 is a diagram showing an example of the SOC/requirement value correspondence table. FIG. 5 is a graph showing a relationship among the SOC, the discharging requirement value, and the charging requirement value of the capacitor 19, a horizontal axis indicates the SOC[%], and a vertical axis indicates the requirement values. In addition, in FIG. 5, the discharging requirement value is a positive value, and the charging requirement value is a negative value. Moreover, the charging requirement value of FIG. 5 is a value for allowing the motor generator 12 to function as a generator in order to charge the capacitor 19. The regenerative power of the swiveling electric motor 21 is charged into the capacitor 19 separately from the charging of the generated power of the motor generator 12 corresponding to the charging requirement value.

A charging requirement line CL1 indicated by a broken line of FIG. 5 shows a transition of the charging requirement value which is adopted in a case where the swiveling electric motor 21 is in the power-running operation state. In addition, the charging requirement value becomes a value C1 in a case where the SOC is 40[%] or less, and the value C1 is maintained even when the SOC further decreases. The charging requirement value gradually approaches zero until the SOC reaches 45[%] after exceeding 40[%], and the charging requirement value becomes zero (including the vicinity of zero, the same will apply hereinafter) in a case where the SOC is 45[%] or more. In a case where the charging requirement line CL1 is adopted, the charging requirement value more easily increases when the SOC is 40[%] or less than when the SOC exceeds 40[%]. Accordingly, the state-of-charge increases from the case where the SOC relatively is low and is easily maintained from 40[%] to 45[%]. In addition, since the value C1 is set to be relatively low even when the SOC further decreases, electric power generation decreases, and an engine output is easily applied to a hydraulic load and a swivel load.

In addition, a charging requirement line CL2 indicated by a dashed line of FIG. 5 shows a transition of the charging requirement value which is adopted in a case where the swiveling electric motor 21 is in the regeneration operation state. In addition, the charging requirement value becomes a value C2 in a case where the SOC is 40[%] or less, and the value C2 is maintained even when the SOC further decreases. The charging requirement value gradually approaches zero until the SOC reaches 60[%] after exceeding 40[%], and the charging requirement value becomes zero in a case where the SOC is 60[%] or more. In a case where the charging requirement line CL2 is adopted, the charging requirement value more easily increases when the SOC is 40[%] or less than when the SOC exceeds 40[%]. In addition, the SOC is easily maintained in the vicinity of 45[%] to 60[%]. In addition, since the value C2 is set to be relatively low even when the SOC further decreases, electric power generation decreases, and an engine output is easily applied to a hydraulic load and a swivel load. The charging is more easily performed in the case of the value C2 than in the case of the value C1. This is because it is not necessary to consider the electric power generation with respect to the swivel load so much since the swivel is being regenerated.

In addition, a charging requirement line CL3 indicated by a double-dashed line of FIG. 5 shows a transition of the charging requirement value which is adopted in a case where the swiveling electric motor 21 is in a stop state. In addition, the charging requirement value becomes a value C3 in a case where the SOC is 40[%] or less, gradually approaches zero until the SOC reaches 60[%] after exceeding 40[%], and the charging requirement value becomes zero in a case where the SOC is 60[%] or more. In a case where the charging requirement line CL3 is adopted, the charging requirement value more easily increases when the SOC is 40[%] or less than when the SOC exceeds 40[%]. Accordingly, the SOC is easily maintained between 45[%] and 60[%]. In addition, since the value C3 is set to be relatively low even when the SOC further decreases, electric power generation decreases, and an engine output is easily applied to a hydraulic load and a swivel load. The level of the value C3 is lower than that of the value C2, and is higher than that of the value C1. This is because it is considered that the swiveling is being stopped.

In addition, a discharging requirement line DL1 indicated by a broken line of FIG. 5 shows a transition of the discharging requirement value which is adopted in a case where the swiveling electric motor 21 is in the power-running operation state. Moreover, the discharging requirement value becomes zero in a case where the SOC is 60[%] or less, increases at a constant ratio until the SOC reaches 100[%] after exceeding 60[%], and becomes a D1 value in a case where the SOC reaches 100[%]. In a case where the discharging requirement line DL1 is adopted, it is possible to increase a driving force of the electric motor (for example, swivel) if discharging increases as the level of the SOC increases. Accordingly, the SOC easily decreases, and is easily maintained in the vicinity of 60[%].

In addition, a discharging requirement line DL2 indicated by a dashed line of FIG. 5 shows a transition of the discharging requirement value which is adopted in a case where the swiveling electric motor 21 is in the regeneration operation state. Moreover, the discharging requirement value becomes zero in a case where the SOC is 70[%] or less, increases at a constant ratio until the SOC reaches 80[%] after exceeding 70[%], and becomes a D2 value in a case where the SOC is 80[%] or more. In a case where the discharging requirement line DL2 is adopted, it is possible to increase a driving force of the electric motor (for example, assist) if discharging further increases when the SOC is 80[%] or more than when the SOC is less than 80[%]. Accordingly, the SOC easily decreases, and is easily maintained between 70[%] and 80[%], particularly, in the vicinity of 70[%].

In addition, a discharging requirement line DL3 indicated by a double-dashed line of FIG. 5 shows a transition of the discharging requirement value which is adopted in a case where the swiveling electric motor 21 is in the stop state. Moreover, the discharging requirement value becomes zero in a case where the SOC is 70[%] or less, increases at a constant ratio until the SOC reaches 85[%] after exceeding 70[%], and becomes a D3 value in a case where the SOC is 85[%] or more. In a case where the discharging requirement line DL3 is adopted, it is possible to further increase the driving force of the electric motor when the SOC is 85[%] or more than when the SOC is less than 85[%]. However, the SOC more easily decreases as the driving force increases. Accordingly, the SOC is easily maintained between 70[%] and 85[%], particularly, in the vicinity of 70[%].

In the graph of FIG. 5, if the current SOC of the capacitor 19 is 70[%] and the current state of the swiveling electric motor 21 is in the power-running operation state, the charging requirement value is zero, and the discharging requirement value is D4. If the current SOC of the capacitor 19 is 30[%] and the current state of the swiveling electric motor 21 is in the regeneration operation state, the charging requirement value is C2 and the discharging requirement value is zero. In this way, the charging of the capacitor 19 performed by the power generation and the swivel regeneration of the motor generator 12, and the discharging of the capacitor 19 for performing the assist and the swivel power running of the motor generator 12 are performed according to substantially the specific discharging requirement line and charging requirement line. A region in which the discharging is more easily performed as the SOC increases with respect to the discharging and the charging is more easily performed as the SOC decreases with respect to the charging, and a region in which the charging requirement value is constant even when the SOC decreases are provided. According to this setting, the power storage system 120 easily generates the driving force by the discharging, an increase in a load of the engine 11 is prevented by the power generation, and workability is improved.

Figure 6:
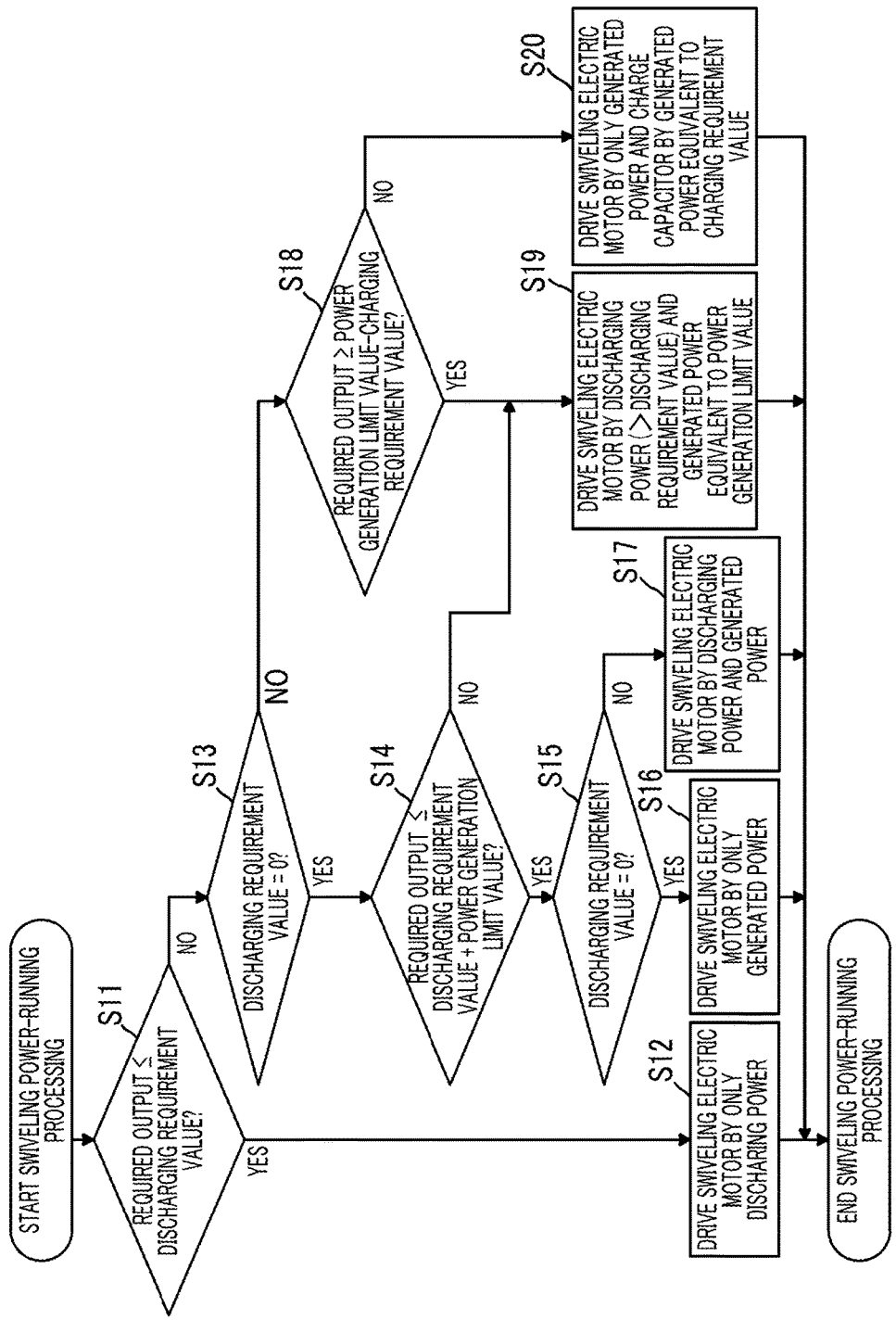
FIG. 6 is a flowchart showing a flow of swiveling power-running processing.

Next, with reference to FIG. 6, processing (hereinafter, referred to as "swiveling power-running processing") for the controller 30 controlling the charging and discharging of the capacitor 19 using the charging requirement value and the discharging requirement value in the case where the swiveling electric motor 21 is in the power-running operation state will be described.

First, the controller 30 determines that an output (hereinafter, referred to as a "required output") required for the swivel driving of the swiveling electric motor 21 is less than or equal to the discharging requirement value (Step S11). This determination is performed because it is determined whether or not the swiveling electric motor 21 can be driven by only the discharging power. The controller 30 derives the required output from the product of the swivel speed calculated based on the output of the resolver 22 and the swivel torque calculated based on the current flowing through the inverter 20. In addition, the controller 30 compares the required output with the discharging requirement value derived by the requirement value deriving processing of FIG. 4.

In a case where it is determined that the required output is less than or equal to the discharging requirement value (YES in Step S11), the controller 30 drives the swiveling electric motor 21 by only the power (discharging power) discharged by the capacitor 19 (Step S12).

Meanwhile, in a case where it is determined that the required output is greater than the discharging requirement value (NO in Step S11), the controller 30 determines whether or not the charging requirement value is zero (Step S13). In a case where the SOC is equal to or more than a predetermined value based on the used charging requirement line, the charging requirement value which is zero may be adopted to control the capacitor such that the capacitor is no longer charged. In this case, the charging of the capacitor 19 is stopped. In a case where the charging requirement value is not zero, a portion of the generated power is used for charging.

In a case where it is determined that the charging requirement value is zero (YES in Step S13), the controller 30 determines whether or not the required output is less than or equal to the sum of the discharging requirement value and a power generation limit value (Step S14). This determination is performed to determine whether or not the swiveling electric motor 21 can be driven by only the discharging power and the generated power. In addition, the power generation limit value means the maximum value of the power which can be generated by the motor generator 12.

In a case where it is determined that the required output is less than or equal to the sum of the discharging requirement value and the power generation limit value (YES in Step S14), the controller 30 determines whether or not the discharging requirement value is zero (Step S15). In a case where the SOC is less than or equal to a predetermined value based on the used discharging requirement line, the charging requirement value which is zero may be adopted to control the capacitor such that the capacitor is no longer discharged.

In a case where it is determined that the discharging requirement value is zero (YES in Step S15), the controller 30 drives the swiveling electric motor 21 by only the power (generated power) generated by the motor generator 12 (Step S16).

In addition, in a case where it is determined that the discharging requirement value is not zero (NO in Step S15), the controller 30 drives the swiveling electric motor 21 by the discharging power discharged by the capacitor 19 and the power generated by the motor generator 12 (Step S17).

Moreover, in a case where the required output is greater than the sum of the discharging requirement value and the power generation limit value (NO in Step S14), the controller 30 drives the swiveling electric motor 21 by the discharging power which is greater than the discharging power equivalent to the discharging requirement value discharged by the capacitor 19 and the generated power equivalent to the power generation limit value generated by the motor generator 12 (Step S19). This is because it is not possible to supply the required output of the swiveling electric motor 21 by the generated power equivalent to the power generation limit value and the discharging power equivalent to the discharging requirement value. Meanwhile, a swivel output may be controlled so as to be decreased. It is possible to decrease the discharging from the capacitor 19 so as to be equivalent to the discharging requirement value.

In addition, in a case where it is determined that the charging requirement value is not zero (NO in Step S13), the controller 30 determines whether or not the required value is equal to or more than a value obtained by subtracting the charging requirement value from the power generation limit value (Step S18). This is because it is not possible to supply the required output of the swiveling electric motor 21 by only the motor generator 12.

In a case where it is determined that the required output is equal to or more than the value obtained by subtracting the charging requirement value from the power generation limit value (YES in Step S18), the controller 30 drives the swiveling electric motor 21 by the discharging power which is greater than the discharging power equivalent to the discharging requirement value discharged by the capacitor 19, and the generated power equivalent to the power generation limit value generated by the motor generator 12 (Step S19). This is because the capacitor 19 cannot be discharged in the case where the capacitor 19 is charged by the generated power equivalent to the charging requirement value generated by the motor generator 12 and it is not possible to supply the required output of the swiveling electric motor 21 by only the motor generator 12. Meanwhile, the swivel output may be controlled so as to be decreased. It is possible to decrease the discharging from the capacitor 19 so as to be equivalent to the discharging requirement value.

Meanwhile, in a case where the required output is less than the value obtained by subtracting the charging requirement value from the power generation limit value (NO in Step S18), the controller 30 drives the swiveling electric motor 21 by only the power generated by the motor generator 12 and charges the capacitor 19 by the generated power equivalent to the charging requirement value generated by the motor generator 12 (Step S20). That is, the motor generator 12 performs the power generation of the power equivalent to the required output and the power generation of the power equivalent to the charging requirement value.

Figure 7:
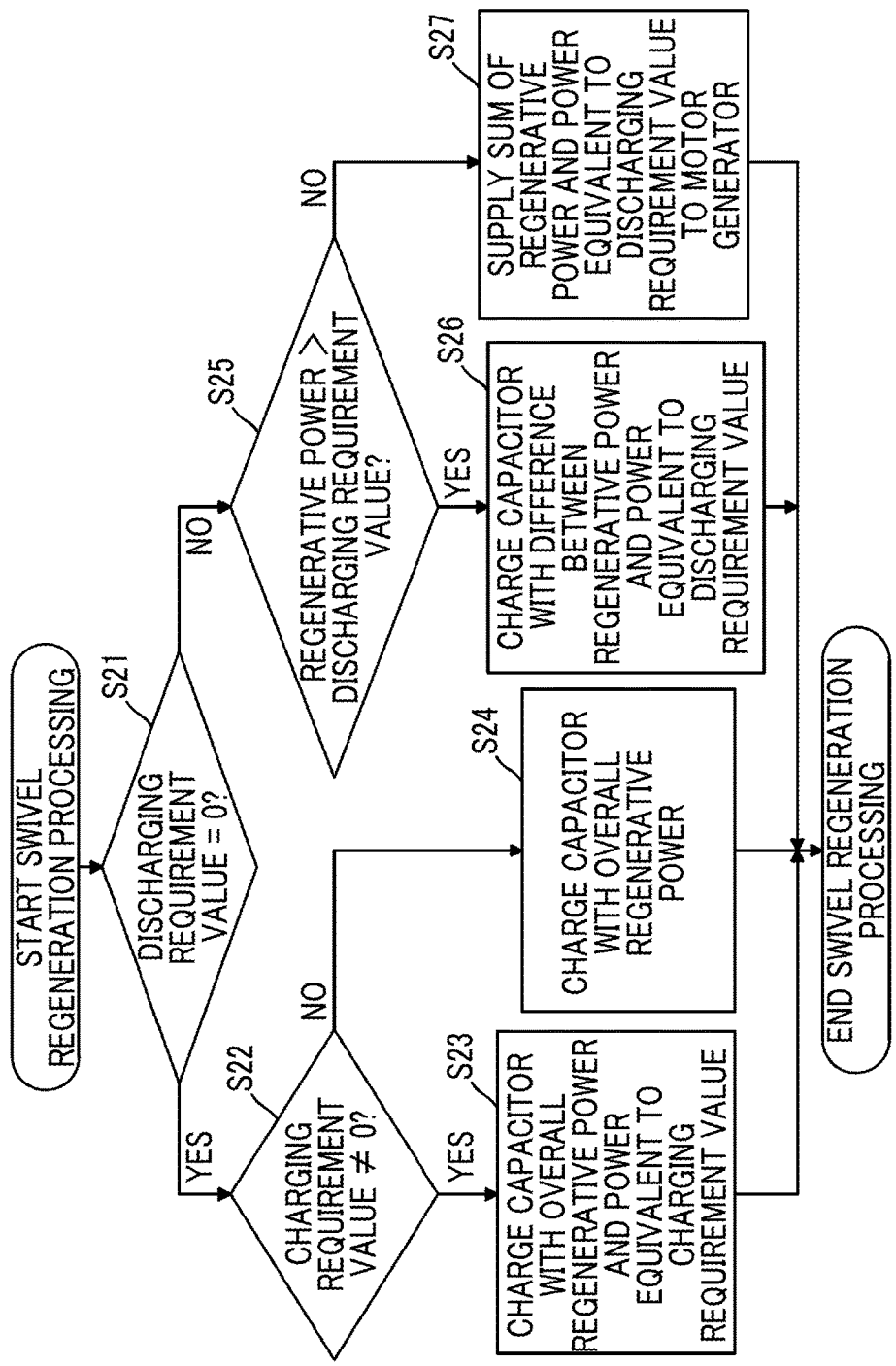
FIG. 7 is a flowchart showing a flow of swivel regeneration processing.

Next, with reference to FIG. 7, processing (hereinafter, referred to as "swivel regeneration processing") for the controller 30 controlling charging and discharging of the capacitor 19 using the charging requirement value and the discharging requirement value in a case where the swiveling electric motor 21 is in the regeneration operation state will be described.

First, the controller 30 determines whether or not the discharging requirement value is zero (Step S21).

In a case where it is determined that the discharging requirement value is zero (YES in S21), that is, in a case where the discharging of the capacitor 19 stops, the controller 30 determines whether or not the charging requirement value is zero (Step S22). This determination is performed to determine whether or not to stop the charging of the capacitor 19.

In a case where it is determined that the charging requirement value is not zero (YES in Step S22), the controller 30 charges the capacitor 19 with the overall regenerative power regenerated by the swiveling electric motor 21 and the generated power equivalent to the charging requirement value (Step S23).

In addition, in a case where it is determined that the charging requirement value is zero (NO in Step S22), the generated power is not present, and the controller 30 charges the capacitor 19 with the overall regenerative power regenerated by the swiveling electric motor 21 (Step S24).

In addition, in a case where it is determined that the discharging requirement value is not zero (NO in Step S21), the controller 30 determines whether or not the regenerative power is greater than the discharging requirement value (Step S25). This determination is performed to determine whether or not to perform the charging of the capacitor 19. In addition, in the present embodiment, the regenerative power is indicated by a negative value, and the discharging requirement value is indicated by a positive value. Accordingly, strictly, the controller 30 determines whether or not the absolute value of the regenerative power is greater than the discharging requirement value.

In a case where it is determined that the regenerative power is greater than the discharging requirement value (YES in Step S25), the controller 30 charges the capacitor 19 with a difference between the regenerative power and the power equivalent to the discharging requirement value (Step S26). In the present embodiment, the controller 30 supplies a portion of the regenerative power equivalent to the discharging requirement value from the swiveling electric motor 21 to the motor generator 12 to function the motor generator 12 as an electric motor, and charges the capacitor 19 with the remaining portion of the regenerative power.

Meanwhile, in a case where it is determined that the regenerative power is less than the discharging requirement value (NO in Step S25), the controller 30 applies the sum of the regeneration power and the power equivalent to the discharging requirement value to the motor generator 12 (Step S27). In the present embodiment, the controller 30 supplies the overall regenerative power from the swiveling electric motor 21 to the motor generator 12, and supplies the power equivalent to the discharging requirement value from the capacitor 19 to the motor generator 12 to function the motor generator 12 as an electric motor.

Moreover, in the present embodiment, the power which can be accepted by the motor generator 12 which functions as an electric motor is limited by a predetermined assist limit value. In this case, the assist limit value means the maximum value of the power which can be accepted by the motor generator 12 which functions as an electric motor. The reason why the assist limit value is the maximum value is because it is possible to prevent an assist output from excessively increasing and rotating speed of the engine 11 from increasing. Accordingly, in a case where the sum of the regenerative power and the power equivalent to the discharging requirement value exceeds the power equivalent to the assist limit value, since the power equivalent to the discharging requirement value is decreased by the controller 30, that is, the power discharged from the capacitor 19 is decreased, the power supplied to the motor generator 12 is the same as the power equivalent to the assist limit value.

By repeatedly performing the above-described swivel regeneration processing, as shown by the charging requirement line CL2 of FIG. 5, in a case where the capacitor 19 indicates the SOC (for example, 30%) corresponding to the discharging requirement value which is zero, the controller 30 supplies the overall regenerative power to the capacitor 19 to charge the capacitor 19, generates the power equivalent to the charging requirement value by the motor generator 12, and charges the capacitor 19 by the generated power. In this way, in a case where the SOC of the capacitor 19 is low, the controller 30 causes the motor generator 12 to generate power even when the swivel regeneration is performed so as to charge the capacitor 19, and the controller 30 returns the capacitor 19 to a state where the SOC is high.

In addition, as shown by the discharging requirement line DL2 of FIG. 5, the controller 30 prevents overcharging of the capacitor 19. For example, in a case where the capacitor 19 indicates the SOC (for example, a value which is greater than 70%) corresponding to the discharging requirement value which is not zero, if the magnitude of the regeneration power is greater than the magnitude of the discharging requirement value, the controller charges the capacitor 19 with the differential power therebetween. In addition, the controller 30 supplies the power equivalent to the discharging requirement value from the swiveling electric motor 21 to the motor generator 12 to function the motor generator 12 as an electric motor. In this way, even in a case where 180° swivel or the like is performed and a great regenerative power is generated, since a portion of the regenerative power is consumed by the motor generator 12, the controller 30 prevents the overcharging of the capacitor 19.

In addition, in a case where the capacitor 19 indicates the SOC (for example, a value which is greater than 70%) corresponding to the discharging requirement value which is not zero, if the magnitude of the regeneration power is less than or equal to the magnitude of the discharging requirement value, the controller 30 causes the motor generator 12 to function as an electric motor. For example, until the capacitor reaches the SOC (for example 70%) corresponding to the discharging requirement value which is zero, the sum of the regenerative power and the power equivalent to the discharging requirement value is applied to the motor generator 12 to function the motor generator 12 as an electric motor. In this way, the controller 30 prevents the overcharging of the capacitor 19.

Figure 8:
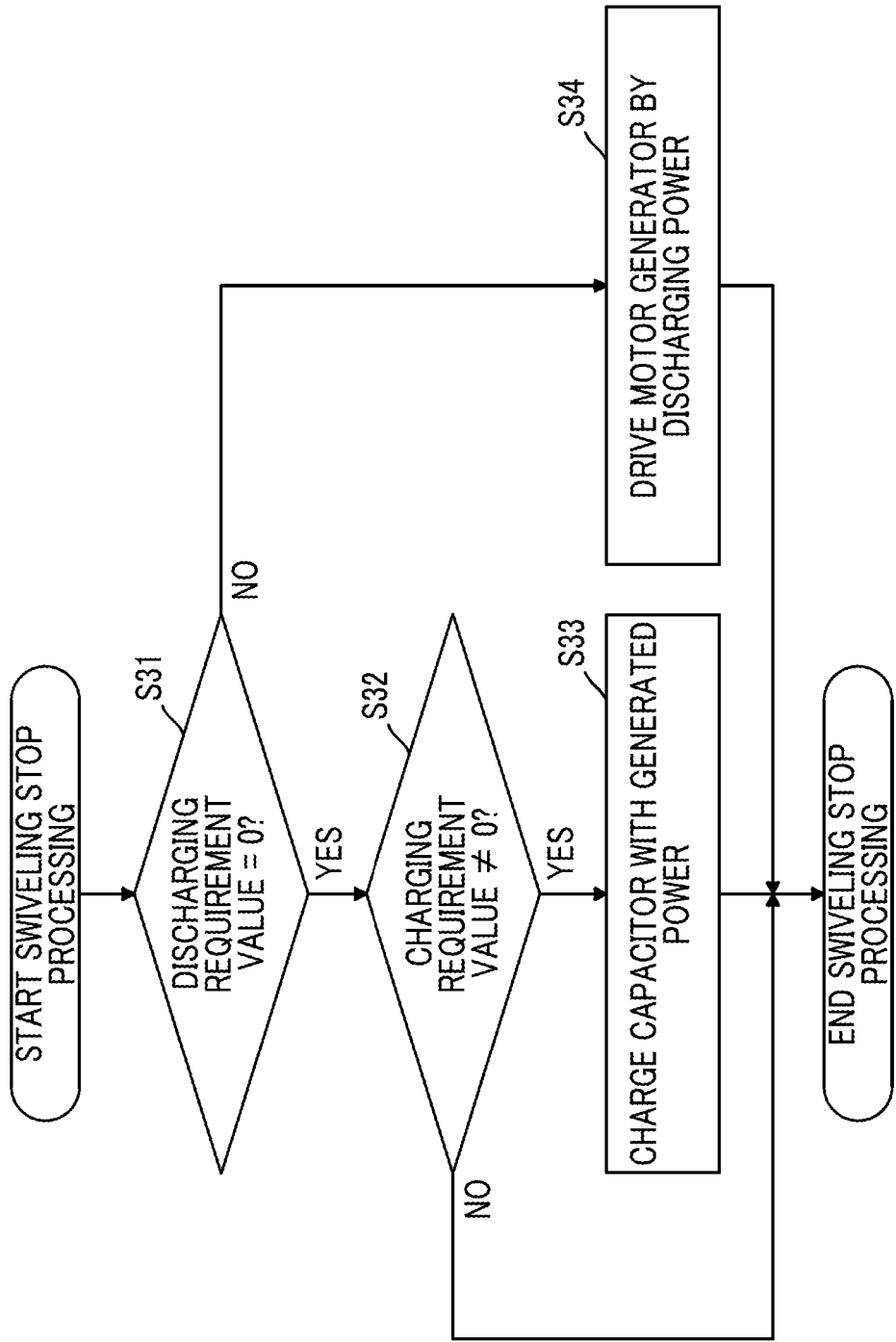
FIG. 8 is a flowchart showing a flow of swiveling stop processing.

Next, with reference to FIG. 8, in a case where the swiveling electric motor 21 is in the stop state, processing (hereinafter, referred to as "swiveling stop processing") for the controller 30 controlling charging and discharging of the capacitor 19 using the charging requirement value and the discharging requirement value will be described. In addition, FIG. 8 is a flowchart showing the flow of the swiveling stop processing, and in the case where the swiveling electric motor 21 is in the stop state, the controller 30 repeatedly performs the swiveling stop processing at a predetermined control period.

First, the controller 30 determines whether or not the discharging requirement value is zero (Step S31). This determination is performed to determine whether or not the discharging of the capacitor 19 stops.

In a case where it is determined that the discharging requirement value is zero (YES in Step S31), that is, in a case where it is determined that the discharging of the capacitor 19 stops, the controller 30 determines whether or not the charging requirement value is zero (Step S32). This determination is performed to determine whether or not the charging of the capacitor 19 stops.

In a case where it is determined that the charging requirement value is not zero (YES in Step S32), that is, in a case where the charging of the capacitor 19 does not stop, the controller 30 causes the motor generator 12 to function as a generator and charges the capacitor 19 with the power generated by the motor generator 12 (Step S33).

In addition, in a case where it is determined that the charging requirement value is zero (NO in Step S32), that is, in a case where the charging of the capacitor 19 stops, the controller 30 does not charge the capacitor 19. Accordingly, the motor generator 12 does not function as a generator for only the charging of the capacitor 19. However, the motor generator 12 functioning as a generator for other objects is not prohibited.

Meanwhile, in a case where it is determined that the discharging requirement value is not zero (NO in Step S31), that is, in a case where the discharging of the capacitor 19 does not stop, the controller 30 drives the motor generator 12 by the power discharged by the capacitor 19 (Step S34).

By repeatedly performing the above-described swiveling stop processing, as shown by the charging requirement line CL3 of FIG. 5, the controller 30 prevents the overdischarging of the capacitor 19. For example, the capacitor 19 indicating the SOC (for example, 30%) corresponding to the charging requirement value which is not zero is charged to the SOC (for example, 60%) corresponding to the charging requirement value which is zero. In this way, in a predetermined case, since the controller 30 charges the capacitor 19 even when swivel stops, the overdischarging of the capacitor 19 is prevented. For example, the predetermined case includes a case where the discharging of the capacitor 19 for allowing the motor generator 12 to function as an electric motor increases to cause the load of the engine 11 to be constant increases and the SOC of the capacitor 19 decreases.

Moreover, as shown by the discharging requirement line DL3 of FIG. 5, the controller 30 discharges the capacitor 19 indicating the SOC (for example, 90%) corresponding to the discharging requirement value which is not zero to the SOC (for example, 70%) corresponding to the discharging requirement value which is zero. In this way, the controller 30 can prevent the SOC of the capacitor 19 from excessively increasing even in a case where the capacitor 19 is frequently charged. For example, the capacitor 19 is frequently charged by increasing opportunity of allowing the motor generator 12 to function as a generator in order to intentionally apply a load to the engine 11 or increasing opportunity of allowing the motor generator 12 to function as an electric motor in order to make the load of the engine 11 be constant.

In addition, in a case where the capacitor 19 indicates the SOC (for example, 60% or more and 70% or less) in which the charging requirement value and the discharging requirement value are zero, the controller 30 does not charge or discharge the capacitor 19.

According to the above-described configuration, the controller 30 controls the charging and discharging of the capacitor 19 based on the charging requirement value and the discharging requirement value corresponding to the current SOC of the capacitor 19. Accordingly, it is possible to appropriately control the charging and discharging of the capacitor 19.

In addition, the controller 30 changes the charging requirement value and the discharging requirement value according to the state of the swiveling electric motor 21. Accordingly, it is possible to more appropriately control the charging and discharging of the capacitor 19.

Figure 9:
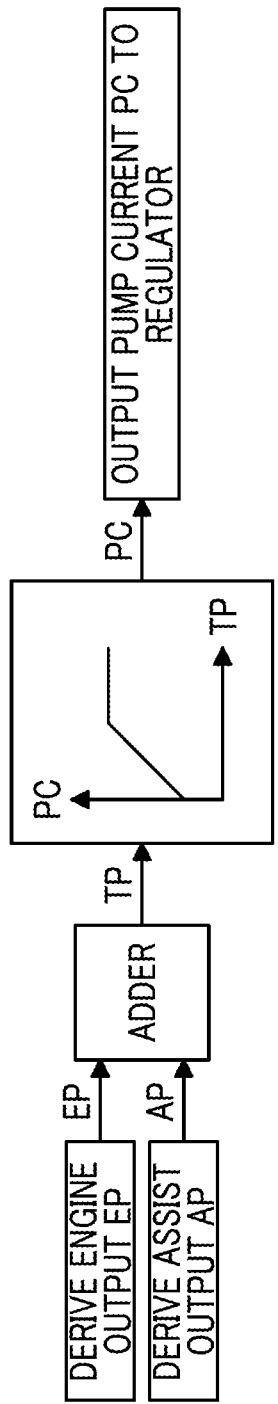
FIG. 9 is a conceptual diagram explaining pump maximum output increasing and decreasing processing.

Next, with reference to FIG. 9, in a case where the motor generator 12 functions as a generator or an electric motor, processing (hereinafter, referred to as "pump maximum output increasing and decreasing processing") for the controller 30 increasing and decreasing the pump maximum output of the main pump 14 will be described. In addition, FIG. 9 is a conceptual diagram explaining the pump maximum output increasing and decreasing processing. In addition, in the present embodiment, the output (absorption horsepower) of the main pump 14 is calculated by the product of an ejection amount and an ejection pressure of the main pump 14.

Specifically, the controller 30 derives an engine output EP. In the present embodiment, the controller 30 receives a detection value of an engine rotating speed sensor (not shown), and derives the engine output EP with reference to an engine rotating speed/engine output correspondence map which is stored in the internal memory in advance.

In addition, the controller 30 derives an assist output AP. In the present embodiment, the controller 30 derives the power transmitted and received between the motor generator 12 and the capacitor 19 as the assist output AP, based on the detection values of a capacitor voltage detecting unit 112 and the capacitor current detecting unit 113. In addition, in the present embodiment, the assist output AP becomes a positive value in a case where the motor generator 12 functions as an electric motor (in a case where the capacitor 19 is discharged), and the assist output AP becomes a negative value in a case where the motor generator 12 function as a generator (in a case where the capacitor 19 is charged).

Thereafter, the controller 30 adds the engine output EP and the assist output AP to derive a total output TP. The total output TP becomes a value which is greater by the assist output AP than the engine output EP in the case where the motor generator 12 functions as an electric motor (in the case where the capacitor 19 is discharged), and the total output TP becomes a value which is smaller by the assist output AP than the engine output EP in the case where the motor generator 12 functions as a generator (in the case where the capacitor 19 is charged).

Thereafter, the controller 30 derives a pump current PC. In the present embodiment, the controller 30 receives the detection value of the engine rotating speed sensor, and derives the pump current PC with reference to a total output/pump current correspondence map corresponding to the engine rotating speed which is stored in the internal memory in advance.

Thereafter, the controller 30 outputs the pump current PC to the regulator (not shown) of the main pump 14. In addition, the regulator is a device which adjusts a swash plate tilt angle of the main pump 14 according to the command from the controller 30 and controls the ejection amount of the main pump 14. In the present embodiment, the regulator decreases the ejection amount of the main pump 14 as the pump current PC decreases.

Accordingly, if the engine output EP is constant, the controller 30 increases the pump current PC and the pump maximum output of the main pump 14 as the assist output AP increases. That is, if the engine rotating speed is constant, the controller 30 may increase the pump current PC and the pump maximum output of the main pump 14 as power consumption (discharging amount of the capacitor 19) of the motor generator 12 increases. Since the total output TP increases if the assist output AP increase and there are allowances for the total output TP, the above-described increase in the pump maximum output of the main pump 14 is performed such that the main pump 14 can effectively use the allowances. As a result, the output (absorption horsepower) of the main pump 14 is controlled within a range of the increased pump maximum output. Meanwhile, in a case where a sudden load is applied to the engine 11, the load of the main pump 14 may be absorbed by increasing an assist force without regulating the regulator.

Figure 10:
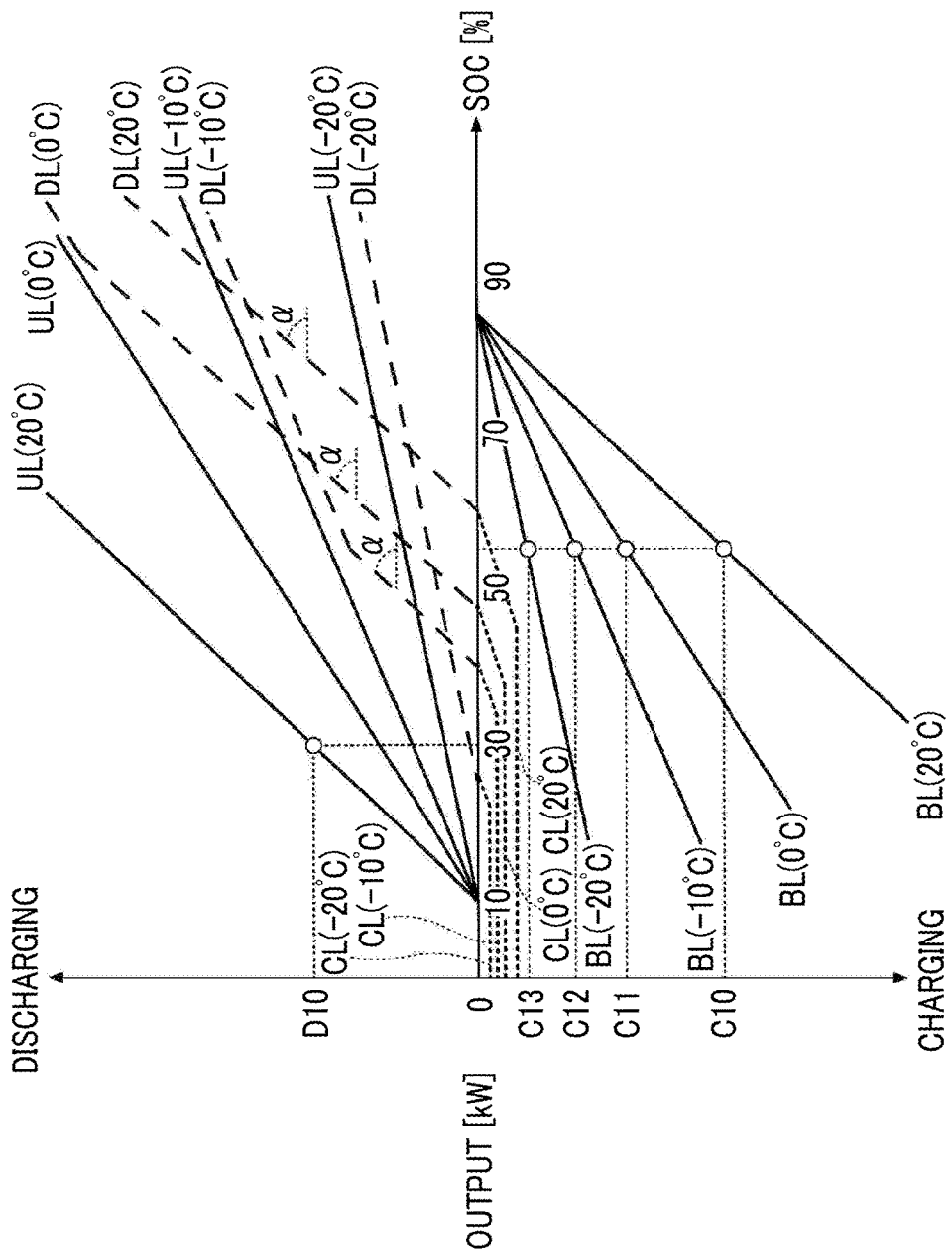
FIG. 10 is a diagram showing another example of the SOC/requirement value correspondence table.

Next, with reference to FIG. 10, processing for the controller 30 adjusting the content of the SOC/requirement value correspondence table according to a capacitor temperature will be described. In addition, here, the capacitor temperature is adopted. However, temperatures of environments, mechanisms, or the like which influencing the capacitor 19 may be adopted. In addition, FIG. 10 is a diagram showing another example of the SOC/requirement value correspondence table, and corresponds to the FIG. 5. Specifically, FIG. 10 is a graph showing the relationship between the discharging requirement value and the charging requirement value which are adopted in a case where the SOC of the capacitor 19 and the swiveling electric motor 21 are in the power-running operation state, a horizontal axis indicates the SOC[%], and a vertical axis indicates outputs [kW].

In addition, a discharging requirement line DL (20° C.) indicated by a broken line of FIG. 10 shows a transition of the discharging requirement value which is adopted in a case where the swiveling electric motor 21 is in the power-running operation state and the capacitor temperature is 20° C., and is equivalent to the discharging requirement line DL1 of FIG. 5. In addition, a discharging requirement line DL (0° C.) indicated by a broken line shows the transition of the discharging requirement value which is adopted in a case where the capacitor temperature is 0° C. Similarly, a discharging requirement line DL (−10° C.) indicated by a broken line shows the transition of the discharging requirement value which is adopted in a case where the capacitor temperature is −10° C., and a discharging requirement line DL (−20° C.) indicated by a broken line shows the transition of the discharging requirement value which is adopted in a case where the capacitor temperature is −20° C.

In addition, a charging requirement line CL (20° C.) indicated by a dotted line of FIG. 10 shows the transition of the charging requirement value which is adopted in a case where the swiveling electric motor 21 is in the power-running operation state and the capacitor temperature is 20° C., and corresponds to the charging requirement line CL1 of FIG. 5. Moreover, a charging requirement line CL (0° C.) indicated by a dotted line shows the transition of the charging requirement value which is adopted in a case where the capacitor temperature is 0° C. Similarly, a charging requirement line CL (−10° C.) indicated by a dotted line shows the transition of the charging requirement value which is adopted in a case where the capacitor temperature is −10° C., and a charging requirement line CL (−20° C.) indicated by a dotted line shows the transition of the charging requirement value which is adopted in a case where the capacitor temperature is −20° C.

A discharging limit line UL(20° C.) indicated by a solid line of FIG. 10 shows a transition of a discharging limit value in a case where the capacitor temperature is 20° C. The discharging limit value means the maximum value of the power which can be discharged by the capacitor 19, and is used to prevent overdischarging of the capacitor 19. Specifically, the discharging limit value is used to limit the discharging power of the capacitor 19 such that a terminal voltage of the capacitor 19 is not below a predetermined lower limit voltage. In FIG. 10, the discharging power of the capacitor 19 is limited to a value D10 in a case where the SOC is 30 [%], and if the discharging power of the capacitor 19 exceeds the value D10, there is a concern that the terminal voltage may be below the lower limit voltage. In addition, a discharging limit line UL(0° C.) indicated by a solid line shows a transition of a discharging limit value in a case where the capacitor temperature is 0° C. Similarly, a discharging limit line UL(−10° C.) indicated by a solid line shows a transition of a discharging limit value in a case where the capacitor temperature is −10° C., and a discharging limit line UL(−20° C.) indicated by a solid line shows a transition of a discharging limit value in a case where the capacitor temperature is −20° C.

In addition, a charging limit line BL(20° C.) indicated by a solid line of FIG. 10 shows a transition of a charging limit value in a case where the capacitor temperature is 20° C. The charging limit value means the maximum value of the power which can be charged by the capacitor 19, and is used to prevent overcharging of the capacitor 19. Specifically, the discharging limit value is used to limit the charging power of the capacitor 19 such that the terminal voltage of the capacitor 19 does not exceed a predetermined upper limit voltage. In FIG. 10, the charging power of the capacitor 19 is limited to a value C10 in a case where the SOC is 55[%], and if the charging power of the capacitor 19 exceeds the value C10, there is a concern that the terminal voltage may exceed the upper limit voltage. In addition, a charging limit line BL(0° C.) indicated by a solid line shows a transition of a charging limit value in a case where the capacitor temperature is 0° C. Similarly, a charging limit line BL(−10° C.) indicated by a solid line shows a transition of a charging limit value in a case where the capacitor temperature is −10° C., and a discharging limit line BL(−20° C.) indicated by a solid line shows a transition of a charging limit value in a case where the capacitor temperature is −20° C. Hereinafter, the charging limit value and the discharging limit value may be collectively referred to as a charging/discharging limit value.

Next, effects due to changing the discharging requirement line to be adopted according to the capacitor temperature will be described.

In the example of FIG. 10, the discharging requirement line DL (20° C.) becomes zero in a case where the SOC is 60[%] or less, and increases at a change rate a until the SOC reaches 100[%] after exceeding 60[%]. In addition, the discharging requirement line DL (0° C.) becomes zero in a case where the SOC is 48[%] or less, and increases at a change rate a until the SOC reaches 100[%] after exceeding 48[%]. Moreover, the discharging requirement line DL (−10° C.) becomes zero in a case where the SOC is 40[%] or less, increases at a change rate a until the SOC reaches the discharging limit line after exceeding 40[%], and increases along the discharging limit line UL (−10° C.) after reaching the level of the discharging limit line UL(−10° C.). The discharging requirement line DL (−20° C.) becomes zero in a case where the SOC is 25[%] or less, and increase along the discharging limit line UL(−20° C.) until the SOC reaches 100[%] after exceeding 25[%]. The change rates a of the discharge requirement line DL(20° C.), the discharging requirement line DL(0° C.), and the discharging requirement line DL(−10° C.) with respect to the SOC are the same as each other a region less than or equal to the corresponding discharging limit line.

In this way, by decreasing the SOC (discharging start state-of-charge: discharging start SOC) when the discharging requirement value increases from zero as the capacitor temperature decreases, the controller 30 can decrease the SOC when the power-running operation and the regenerative operation of the swiveling electric motor 21 are performed. For example, specifically, in a case where the capacitor temperature is 20° C., the discharging requirement line DL(20° C.) is adopted, and the SOC of the capacitor 19 transits to a range from 60[%] to 80[%] when the power-running operation and the regenerative operation are performed. Meanwhile, for example, in a case where the capacitor temperature is −20° C., the discharging requirement line DL(−20° C.) is adopted, and the SOC of the capacitor 19 is transited to a range from 25[%] to 45[%] when the power-running operation and the regenerative operation are performed. Accordingly, the controller 30 can prevent the charging power which is the regenerative power generated by the swiveling electric motor 21 when the swivel regeneration is performed from exceeding the charging limit line. Specifically, as shown in FIG. 10, in a case where the SOC is 55[%] when the regenerative operation is performed, if the capacitor temperature is 20° C., the capacitor 19 can accept the charging power having the value C10 while prevent the terminal voltage from exceeding the upper limit voltage. However, if the capacitor temperature is 0° C., since the terminal voltage is prevented from exceeding the upper limit voltage, the capacitor 19 cannot accept charging power which is greater than a value C11. In addition, the capacitor 19 cannot accept charging power which is greater than a value C12 if the capacitor temperature is −10° C., and cannot accept charging power which is greater than a value C13 if the capacitor temperature is −20° C. In this way, the charging power (acceptable charging power) which can be accepted by the capacitor 19 decreases as the capacitor temperature decreases. Meanwhile, the acceptable charging power increases as the SOC decreases. From this relationship, the controller 30 decreases the discharging start SOC as the capacitor temperature decreases, decreases the SOC when the power-running operation and the regenerative operation of the swiveling electric motor 21 are performed, and can prevent the regenerative power (charging power) when the swivel regeneration is performed from exceeding the charging limit line.

In addition, the internal resistance R of the capacitor 19 increases as the capacitor temperature decreases. In addition, since the controller 30 decreases the discharging start SOC as the capacitor temperature decreases, the terminal voltage of the capacitor 19 at the time of charging and discharging decreases. Accordingly, the discharging current which flows to obtain the same discharging power increases, and the charging current which flows to obtain the charging power increases. Accordingly, since the internal resistance R increases and the charging and discharging currents increase as the capacitor temperature decreases, the heating value of the capacitor 19 increases. As a result, it is possible to promote the warming-up of the capacitor 19. In addition, the warming-up of the capacitor 19 is processing which forcedly increases the capacitor temperature by charging and discharging the capacitor 19 in a case where the capacitor temperature is less than or equal to a predetermined temperature. In the present embodiment, the warming-up is realized by charging and discharging the capacitor 19 using the motor generator 12 or the like even during idling of the engine 11 if the shovel is not operated.

On the other hand, the internal resistance R of the capacitor 19 decreases as the capacitor temperature increases. In addition, since the controller 30 increases the discharging start SOC as the capacitor temperature increases, the terminal voltage of the capacitor 19 at the time of charging and discharging also increases. Accordingly, the discharging current which flows to obtain the same discharging power decreases, and the charging current which flows to obtain the same charging power decreases. Therefore, the heating value of the capacitor 19 decreases according to a decrease in the internal resistance R and decreases in charging and discharging currents as the capacitor temperature increases. As a result, heat loss decreases, and it is possible to use the capacitor 19 with high efficiency.

In addition, the controller 30 causes the change rates a of the discharging requirement line DL (20° C.), the discharging requirement line DL (0° C.), and the discharging requirement line DL (−10° C.) with respect to the SOC to be the same as each other within the region of the discharging limit line or less. Accordingly, effects capable of maintaining operation feeling of the shovel regardless of the capacitor temperature are obtained. Specifically, the required output of the swiveling electric motor 21 when the swiveling power runs easily exceeds the discharging requirement value as the change rate a decreases, the power generation performed by the motor generator 12 starts early, and the pump maximum output of the main pump 14 is more early limited. For example, in a case where lifting and swiveling of the boom are performed, a lifting speed of the boom 4 decreases at a stage which is earlier than the swiveling power running. Accordingly, the change rate a being maintained regardless of the capacitor temperature means that the timing when the lifting speed of the boom 4 decreases is not changed. In addition, the change rate a may be set to be relatively increased in a region in which the SOC is relatively high regardless of the capacitor temperature, particularly. The setting is performed in order to increase the discharging power if necessary when the swiveling power runs, and thereafter, to prevent overcharging when the swivel regeneration is performed. Meanwhile, the change rate a is limited by the discharging limit line in order to protect the capacitor 19. For example, if the change rate at the discharging requirement line DL (−20° C.) increases when the capacitor temperature is −20° C., the discharging power at the discharging start SOC exceeds the discharging limit line UL(−20° C.), and overdischarging occurs. Accordingly, the limitation is performed. Therefore, it is necessary to appropriately set the change rate a in consideration of the discharging limit line.

In addition, in FIG. 10, the discharging requirement line DL is set so as to draw a straight line. However, the discharging requirement line DL may be set so as to draw a curve, and may be set so as to draw a folded line.

In FIG. 10, the discharging requirement line DL, the discharging limit line UL, and the charging limit line BL are shown when the capacitor temperatures are 20° C., 0° C., −10° C., and −20° C. However, in actual, the discharging requirement line DL, the discharging limit line UL, and the charging limit line BL are present at predetermined narrow temperature pitches.

Figure 11:
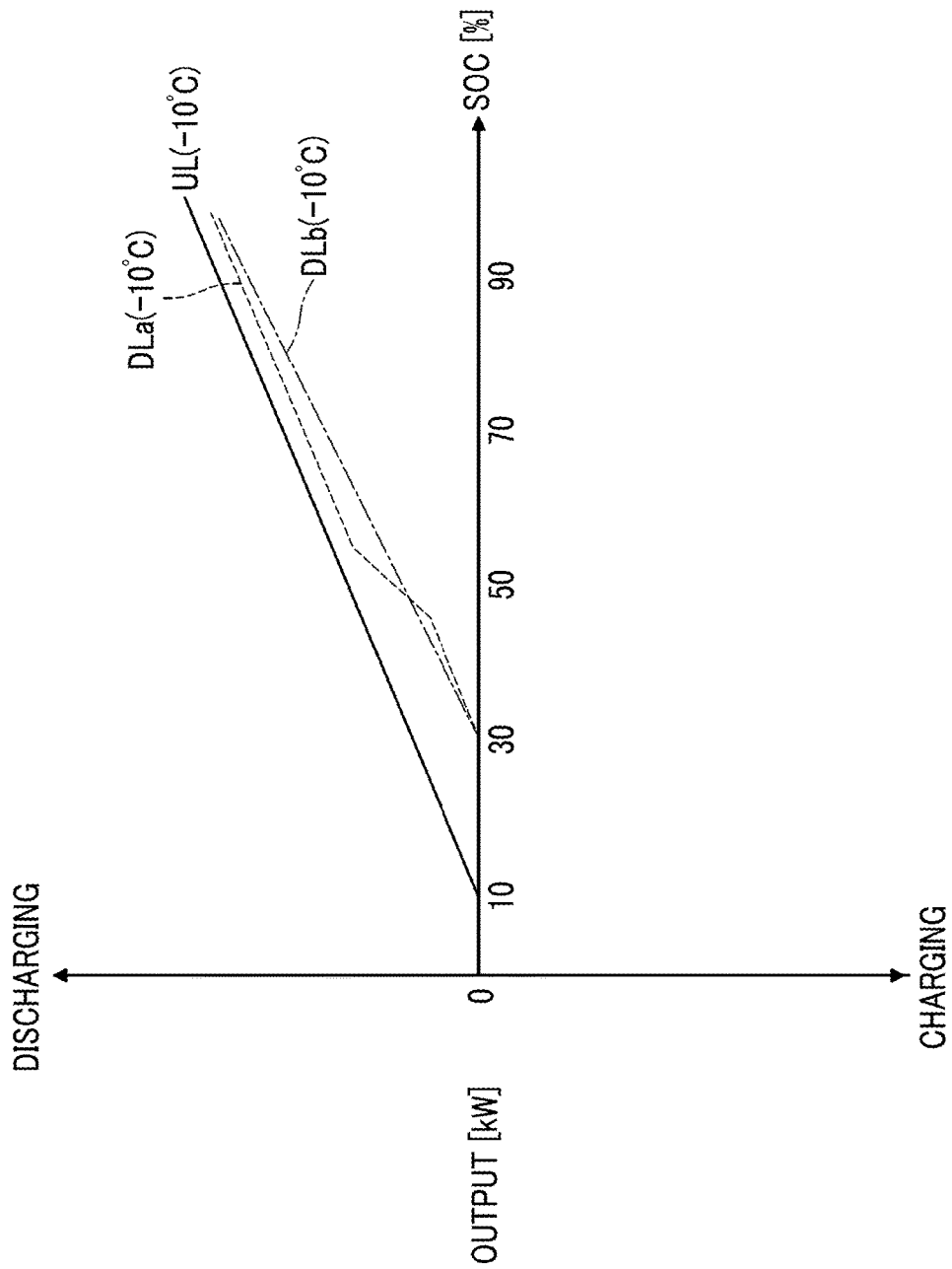
FIG. 11 is a diagram showing another example of a discharging requirement line.

FIG. 11 is a diagram showing another example of the discharging requirement line when the capacitor temperature is −10° C. In addition, in FIG. 11, for simplification, only the discharging limit line UL(−10° C.) and the discharging requirement lines DLa(−10° C.) and DLb(−10° C.) are shown when the capacitor temperature is −10° C., and the discharging limit lines, the discharging requirement lines, and the charging requirement lines at other temperatures are omitted.

The discharging requirement line DLa(−10° C.) shown by a dotted line is an example of a transition which is set to draw a folded line, and increases at a relatively small change rate when the SOC is from 30[%] to 47[%]. In addition, the discharging requirement line DLa(−10° C.) increases at a relatively large change rate until the SOC reaches 55[%], and thereafter, increases at a relatively small change rate until the SOC reaches 100[%]. By adopting this transition, the controller 30 discharges the capacitor 19 at a relatively large discharging power when the SOC is 47[%] to 55[%], and thus, can prevent the terminal voltage of the capacitor 19 when the swivel regeneration is performed after the discharging form exceeding the upper limit voltage.

The discharging requirement line DLb (−10° C.) shown by a dashed line is an example of a transition which is set to draw a straight line without being limited by the discharging limit line UL(−10° C.), and the change rate is not changed when the SOC is from 30[%] to 100[%]. By adopting this transition, unlike the case where the transition is set to draw the folded line, since the discharging requirement value is not rapidly changed by the controller 30 during the swivel power running, it is possible to prevent the operation feeling of the shovel from being rapidly changed.

Figure 12:
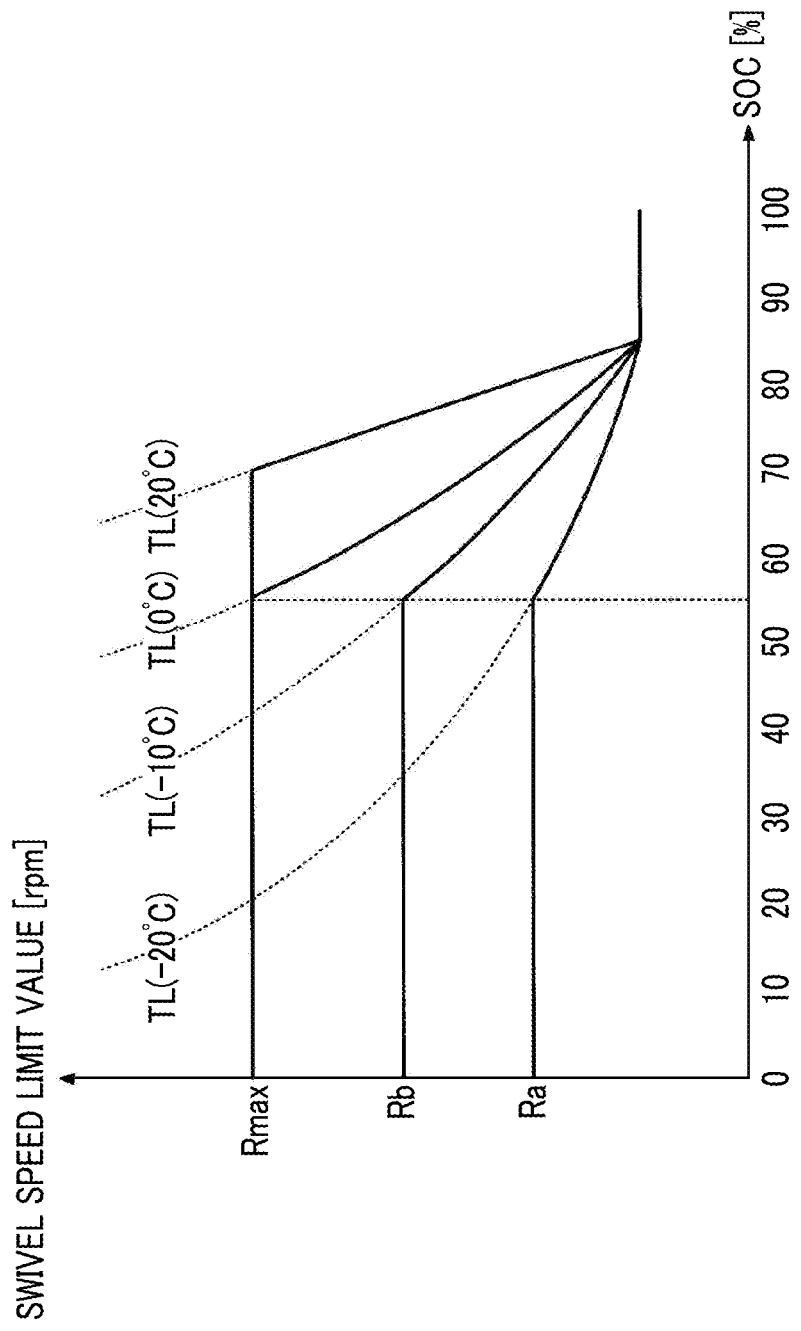
FIG. 12 is a diagram showing a relationship between SOC and a swivel speed limit value of a capacitor.

Next, with reference to FIG. 12, processing for the controller 30 limiting the swivel speed when the swiveling power runs in order to cope with the acceptable charging power which decreases as the SOC of the capacitor 19 increases and the capacitor temperature decreases will be described. Moreover, FIG. 12 is a diagram showing a relationship between the SOC of the capacitor 19 and the swivel speed limit value, and a horizontal axis indicates the SOC[%], and a vertical axis indicates the swivel speed limit value [rpm].

Specifically, the acceptable charging power of the capacitor 19 is determined according to the SOC and the capacitor temperature of the capacitor 19 when the swivel starts. For example, as shown in FIG. 10, if the capacitor temperature is 0° C. and the SOC is 55[%], the acceptable charging power becomes a value C11 with reference to the charging limit line BL (0° C.). If the acceptable charging power is determined, the maximum braking torque which can be realized within the range of the acceptable charging power is determined, and the maximum swivel speed (swivel speed limit value) when the maximum braking torque is required is determined.

In the present embodiment, if the charging limit value is defined as Wc1, the maximum braking torque is defined as Tmax, and the power equivalent to the assist limit value is defined as Wa, a swivel speed limit value Nc1 is presented by the following Expression.

$$Ncl = \frac{\frac{Wcl}{\xi_1} + \frac{Wa}{\xi_2}}{T\max} \qquad \text{[Expression 2]}$$

In addition, each of $\xi_1$ and $\xi_2$ indicates efficiency. Moreover, for example, the time when the swivel starts means the time when the operation amount of the swiveling operation lever exceeds a predetermined value, the time when the swivel speed reaches a predetermined speed, or the like. In addition, the controller 30 determines the swivel speed limit value each time the swivel starts.

FIG. 12 shows a transition of the swivel speed limit value determined as described above with respect to the SOC. Specifically, a swivel speed limit line TL(20° C.) indicated by a dotted line shows a transition of the swivel speed limit value when the capacitor temperature is 20° C., and a swivel speed limit line TL(0° C.) indicated by a dotted line shows a transition of the swivel speed limit value when the capacitor temperature is 0° C. In addition, a swivel speed limit line TL(−10° C.) indicated by a dotted line shows a transition of the swivel speed limit value when the capacitor temperature is −10° C., and a swivel speed limit line TL(−20° C.) indicated by a dotted line shows a transition of the swivel speed limit value when the capacitor temperature is −20° C.

In addition, in the present embodiment, the swivel speed is electrically or mechanically limited to an upper limit Rmax. Moreover, in a case where the SOC is 55[%] or less and the capacitor temperature is 0° C. or less when the swivel starts, the swivel speed limit value when the SOC is 55[%] is adopted. The swivel speed limit value is adopted to prevent the swivel speed limit value from being changed each time the swiveling operation is performed and the actual maximum swivel speed from being changed. Specifically, the swivel speed limit value is limited to a value Rb in a case where the SOC is 55[%] or less and the capacitor temperature is −10° C. when the swivel starts. In addition, the swivel speed limit value is limited to a value Ra in a case where the SOC is 55[%] or less and the capacitor temperature is −20° C. when the swivel starts. If the SOC/requirement value correspondence table shown in FIG. 10 is adopted, in a case where the capacitor temperature is 0° C. or less, generally, the swivel operation is performed within a range in which the SOC is 55[%] or less. Accordingly, even when the swivel speed limit value is changed along the swivel speed limit line within a range in which the SOC is more than 55[%], the actual maximum swivel speed is not changed each time the swiveling operation is performed.

In this way, the controller 30 limits the maximum swivel speed according to the capacitor temperature. Moreover, the controller 30 gradually releases the limitation of the maximum swivel speed according to the increase of the capacitor temperature.

Next, with reference to FIGS. 13A and 13B, processing for controller 30 limiting the maximum swivel torque and the pump maximum output of the main pump 14 when the swiveling power runs in accordance with the limitation of the maximum swivel speed will be described. In addition, FIG. 13A is a diagram showing a relationship between the swivel speed limit value and the swivel torque limit value, a horizontal axis indicates the swivel speed limit value [rpm], and a vertical axis indicates the swivel torque limit value [%]. FIG. 13B is a diagram showing a relationship between the swivel speed limit value and the pump current limit value, a horizontal axis indicates the swivel speed limit value [rpm], and a vertical axis indicates the pump current limit value [mA].

For example, in a case where the SOC is 55[%] or less and the capacitor temperature is −10° C. when the swivel starts, the controller 30 limits the swivel speed limit value to a value Rb. In this case, with reference to the correspondence table shown in FIG. 13A, the controller 30 derives a value Sb as the swivel torque limit value. In addition, with reference to the correspondence table shown in FIG. 13B, the controller 30 derives a value Pb as the pump current limit value.

Similarly, in a case where the SOC is 55[%] or less and the capacitor temperature is −20° C. when the swivel starts, the controller 30 limits the swivel speed limit value to a value Ra (<Rb). In this case, the controller 30 derives a value Sa (<Sb) as the swivel torque limit value, and derives a value Pa (<Pb) as the pump current limit value.

In addition, similarly to the swivel speed limit value, the controller 30 determines the swivel torque limit value and the pump current limit value each time the swivel starts.

The limitation of the swivel torque when the swiveling power runs generates the limitation of acceleration of the upper swivel body 3, and the limitation of the pump current generates the limitation of an operation speed of a hydraulic actuator. In addition, thereafter, alleviation of the limitation of the swivel torque due to the increase of the capacitor temperature generates alleviation of the limitation of the acceleration of the upper swivel body 3, and alleviation of the limitation of the pump current generates alleviation of the operation speed of the hydraulic actuator. Accordingly, if the lifting and swiveling of the boom are performed in a case where the swivel speed limit value is limited to be less than the maximum value Rmax, the lifting speed of the boom 4 is limited in accordance with the limitation of the swivel speed. In addition, thereafter, the limitation of the swivel speed is alleviated as the swivel speed limit value increases toward the maximum Rmax due to the increase of the capacitor temperature, and the limitation of the lifting speed of the boom 4 is alleviated in accordance with the alleviation of the limitation of the swivel speed. As a result, the controller 30 can provide the operation speed of the hydraulic actuator matched to the swivel speed to an operating person, and it is possible to prevent the operation feeling from being damaged.

Moreover, in a case where the maximum value Rmax is adopted as the swivel speed limit value, the controller 30 derives a value Smax as the swivel torque limit value and derives a value Pmax as the pump current limit value. That is, in a case where the maximum swivel speed is not limited, the controller 30 does not limit the maximum swivel torque and the pump maximum output.

According to the above-described configuration, the controller 30 decreases the charging limit value and the discharging limit value according to the decrease of the capacitor temperature and changes the discharging requirement value. In present embodiment, the controller 30 decreases the changes of the charging limit value and the discharging limit value with respect to the change of the SOC, and decreases the change of the discharging requirement value with respect to the change of the SOC. Specifically, the controller 30 decreases the limitation values of the discharging limit line UL and the charging limit line BL according to the decrease of the capacitor temperature. In addition, the controller 30 decreases an inclination of the discharging requirement line DL when the swiveling power runs according to the decrease of the capacitor temperature. Accordingly, even in a case where the controller 30 drives the swiveling electric motor 21 in a state where the capacitor temperature is low, it is possible to prevent the overcharging and overdischarging of the capacitor 19. As a result, before the warming-up of the capacitor 19 is completed, the controller 30 can drive the swiveling electric motor 21 without exerting adverse influences on the capacitor 19.

Moreover, the controller 30 decreases the lower limit of the state-of-charge of the capacitor 19 in which the discharging requirement value has a value which is greater than zero, according to the decrease in the capacitor temperature. In the present embodiment, the controller 30 decreases the discharging start SOC according to the decrease in the capacitor temperature. Accordingly, the controller 30 can control the charging and discharging of the capacitor 19 when the swiveling power runs and when the swivel regeneration is performed such that the SOC of the capacitor 19 transits to a lower range as the capacitor temperature decreases. As a result, the controller 30 charges and discharges the capacitor 19 on the conditions that heat is more easily generated as the capacitor temperature decreases, and can promote the warming-up of the capacitor 19. In addition, since the SOC when the swivel regeneration starts is induced to be lower as the capacitor temperature decreases, it is possible to prevent the terminal voltage of the capacitor 19 during the swivel regeneration from reaching the upper limit voltage, and it is possible to prevent the overcharging of the capacitor 19.

Hereinbefore, the preferred embodiment of the present invention is described in detail. However, the present invention is not limited to the above-described embodiment, and various modifications and replacements may be applied to the above-described embodiment without departing from the gist of the present invention.

For example, in the above-described embodiment, the controller 30 adjusts the content of the SOC/requirement value correspondence table according to the capacitor temperature in the case where the swiveling electric motor 21 is in the power-running operation state. However, the controller 30 does not adjust the content of the SOC/requirement value correspondence table only in the case where the swiveling electric motor 21 is in the power-running operation state, and the controller 30 may adjust the content of the SOC/requirement value correspondence table according to the capacitor temperature even in a case where the swiveling electric motor 21 is in the regeneration operation state and the stop state.

Figure 14:
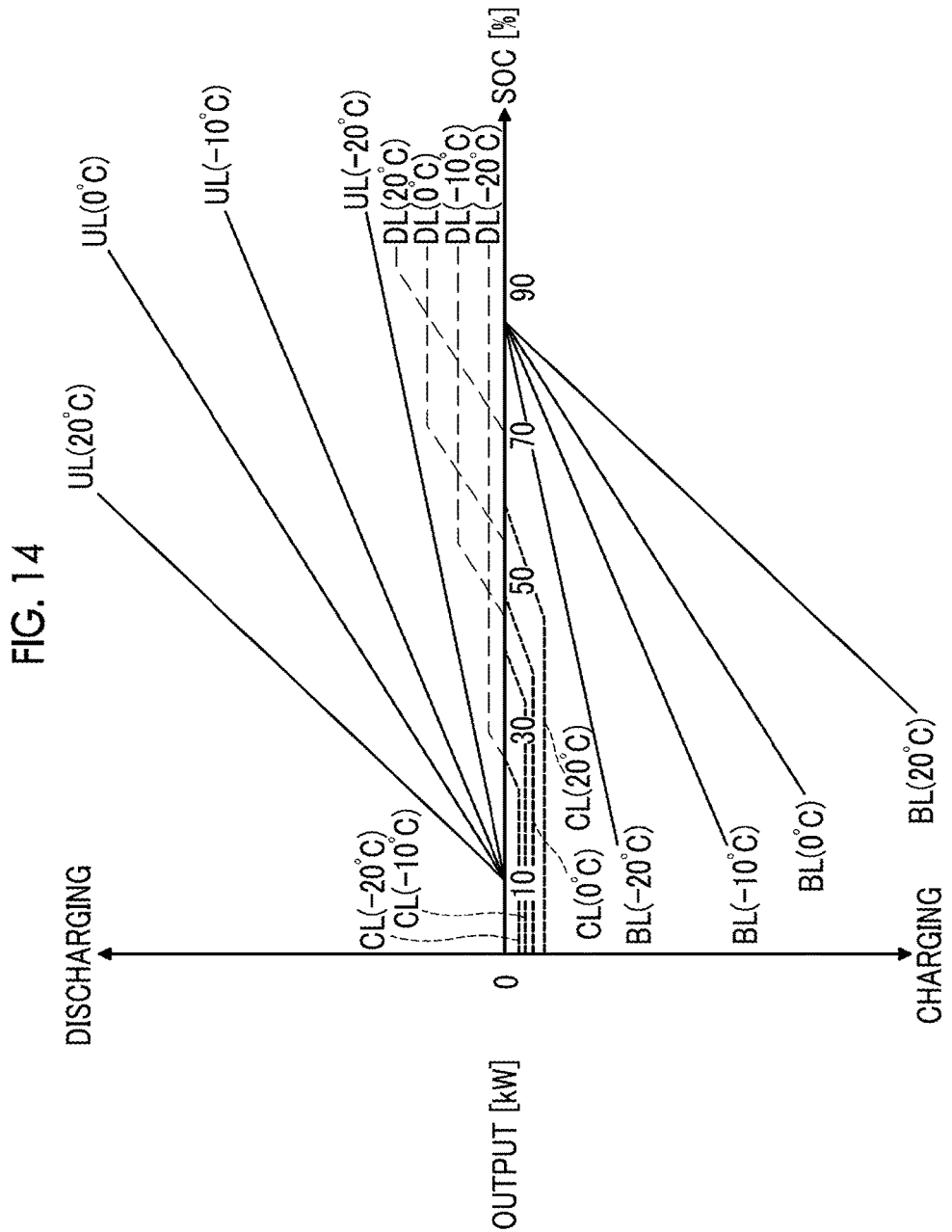
FIG. 14 is a diagram showing still another example of the SOC/requirement value correspondence table.

FIG. 14 is a diagram showing still another example of the SOC/requirement value correspondence table, and corresponds to FIGS. 5 and 10. Specifically, FIG. 14 is a graph showing a relationship between the SOC of the capacitor 19, and the discharging requirement value and the charging requirement value adopted in a case where the swiveling electric motor 21 is in a regeneration operation state.

As shown in FIG. 14, the controller 30 includes not only the SOC/requirement value correspondence table when the swiveling power runs but also the SOC/requirement value correspondence table when the swivel regeneration is performed. In addition, similarly to the case when the swiveling power runs, the controller 30 controls the charging and discharging of the capacitor 19 when the swivel regeneration is performed such that the SOC of the capacitor 19 transits to a lower range as the capacitor temperature decreases.

In addition, although it is not shown, the controller 30 includes a SOC/requirement value correspondence table when the swiveling stops, and similarly to cases when the swiveling power runs and when the swivel regeneration is performed, the controller 30 controls the charging and discharging of the capacitor 19 when the swiveling stops such that the SOC of the capacitor 19 transits to a lower range as the capacitor temperature decreases.

Figure 15:
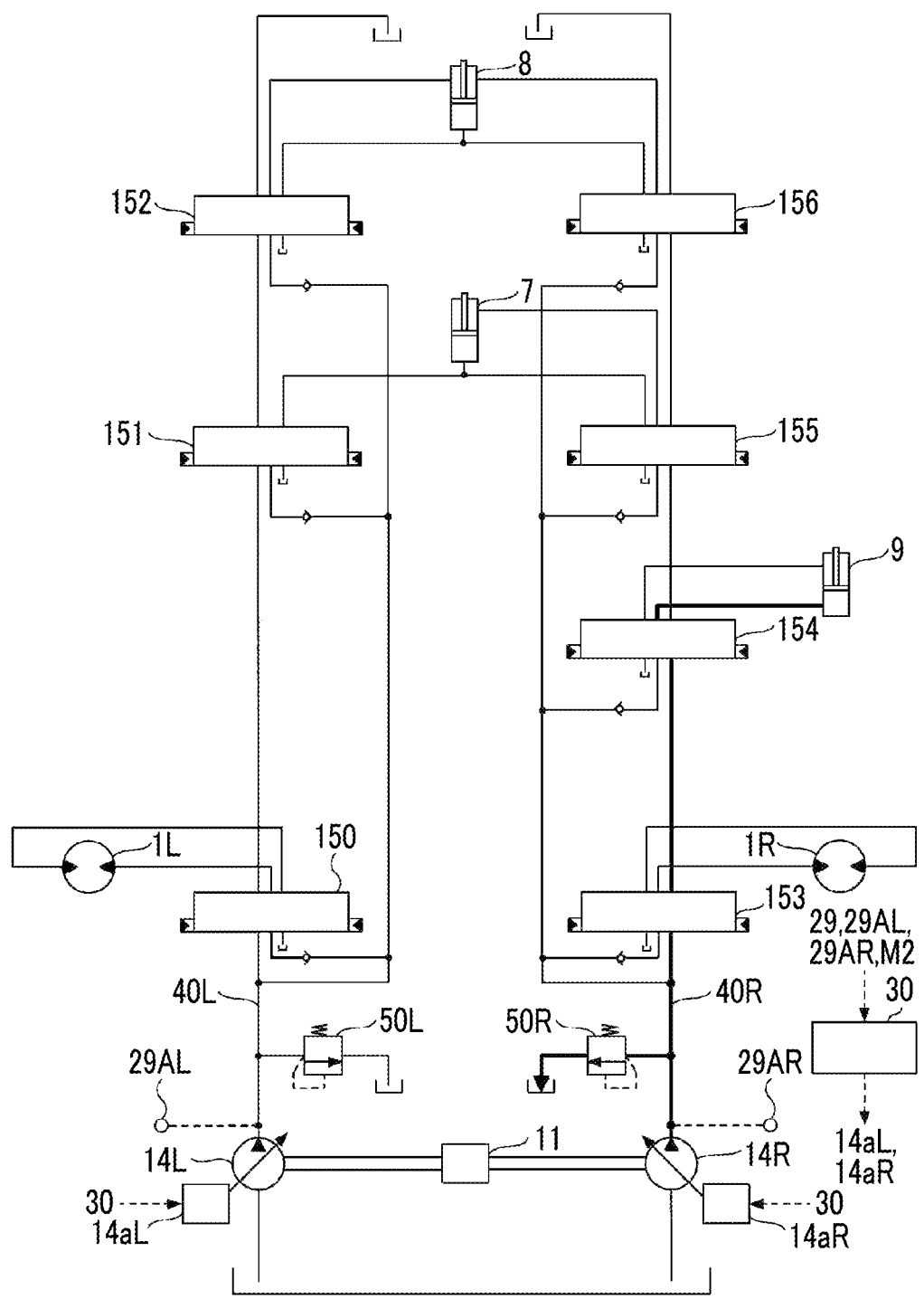
FIG. 15 is a schematic diagram showing a configuration example of a hydraulic circuit.

Next, warming-up of a hydraulic drive system will be described with reference to FIG. 15. FIG. 15 is a schematic diagram of a hydraulic circuit which is mounted on the shovel of FIG. 1. A high-pressure oil passage, a pilot oil passage, and an electric control line are respectively indicated by a solid line, a broken line, and a dotted line.

In the present embodiment, the main pump 14 is configured of two main pumps 14L and 14R, and the regulator 14a is configured of two regulators 14aL and 14aR. Moreover, the regulator 14aL corresponds to the main pump 14L and the regulator 14aR corresponds to the main pump 14R.

Hydraulic oil circulates through the hydraulic circuit from the main pumps 14L and 14R to a hydraulic oil tank via each of center bypass oil passages 40L and 40R.

The center bypass oil passage 40L is a high-pressure oil passage through which flow rate control valves 150 to 152 pass. A relief valve 50L is installed on the upstream side of the flow rate control valve 150. Similarly, the center bypass oil passage 40R is a high-pressure oil passage through which flow rate control valves 153 to 156 pass. A relief valve 50R is installed on the upstream side of the flow rate control valve 153.

The flow rate control valve 150 is a spool valve which controls a flow rate and a flow direction of the hydraulic oil which flows into a left travelling hydraulic motor 1L. The flow rate control valve 153 is a spool valve which controls a flow rate and a flow direction of the hydraulic oil which flows into a right travelling hydraulic motor 1R. In addition, the flow rate control valve 154 is a spool valve which controls a flow rate and a flow direction of the hydraulic oil which flows into the bucket cylinder 9. The flow rate control valve 151 and 155 are spool valves which controls a flow rate and a flow direction of the hydraulic oil which flows into the boom cylinder 7. The flow rate control valve 152 and 156 are spool valves which controls a flow rate and a flow direction of the hydraulic oil which flows into the arm cylinder 8.

The relief valves 50L and 50R are valves which decrease the pressure of the hydraulic oil inside the center bypass oil passages 40L and 40R to a predetermined pressure or less. Specifically, the relief valves 50L and 50R are open in cases where the pressure of the hydraulic oil inside the center bypass oil passages 40L and 40R reaches a predetermined pressure, and discharge the hydraulic oil to the hydraulic oil tank.

In a case where the warming-up of the hydraulic drive system is performed, for example, a person who operates the shovel continues a close operation of the bucket 6 within a range which does not exceed a predetermined time (for example, 30 seconds) in a state where the bucket 6 is closed. In this case, since the hydraulic oil ejected from the main pump 14R cannot flow into a bottom side oil chamber of the bucket cylinder 9, as shown by bold lines in FIG. 15, the pressure of the hydraulic oil inside the center bypass oil passage 40R increases. In addition, the hydraulic oil ejected from the main pump 14R is discharged to the hydraulic oil tank through the relief valve 50R, and the hydraulic oil generates heat due to a pressure loss which is generated by a pipeline resistance when the hydraulic oil passes through the relief valve 50R. As a result, the hydraulic oil which circulates through the hydraulic circuit is warmed. Thereafter, similarly to the case where the bucket 6 is closed, the operating person continues an open operation of the bucket 6 within a range which does not exceed a predetermined time (for example, 30 seconds) in a state where the bucket 6 is open so as to warm the hydraulic oil. In this way, the operating person repeats the opening and closing of the bucket 6, and can increase the temperature of the hydraulic oil. In addition, for example, the operating person may perform operations other than the opening and closing operations of the bucket 6 such as the opening and closing operations of the arm 5 so as to increase the temperature of the hydraulic oil.

Figure 16:
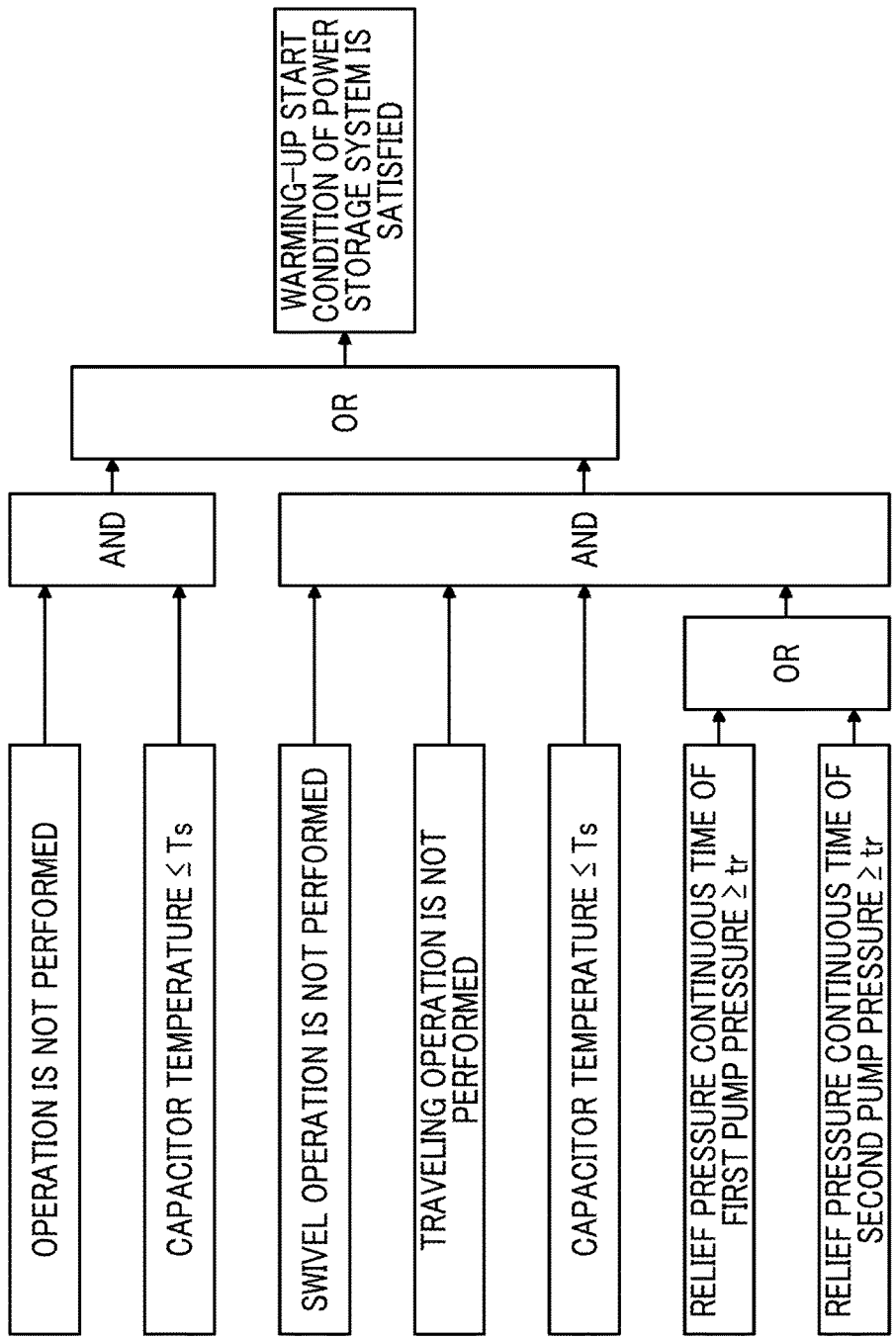
FIG. 16 is a diagram explaining warming-up start conditions of the power storage system.

Next, with reference to FIGS. 16 to 24, the warming-up of the power storage system 120 will be described. FIG. 16 is a diagram explaining warming-up start conditions of the power storage system 120. In addition, the warming-up start conditions of the power storage system 120 include conditions that the warming-up of the power storage system 120 starts when the shovel is in an idling state, and conditions that the warming-up of the power storage system 120 starts when the operating person performs the warming-up of the hydraulic drive system.

Specifically, the controller 30 starts the warming-up of the power storage system 120 in cases where the operating person does not operate the operation device 26 over a predetermined time and the capacitor temperature is less than and equal to a predetermined warming-up start capacitor temperature Ts. This condition corresponds to the condition that the warming-up of the power storage system 120 starts when the shovel is an idling state. In addition, for example, the capacitor temperature may be a statistic value such as an average value, an intermediate value, a minimum value for a predetermined time, or may be an instantaneous value. Moreover, the capacitor temperature may be indirectly detected by detecting a temperature of a cooling water used so as to cool the capacitor 19. Alternatively, the controller 30 may start the warming-up of the power storage system 120 in cases where the operating person does not operate the operation device 26 for a predetermined time and a cooling-water temperature detected by a cooling-water temperature sensor (not shown) is less than and equal to a predetermined warming-up start capacitor temperature Ts.

In addition, the controller 30 starts the warming-up of the power storage system 120 in a case where it is determined that the operating person does not perform the swiveling operation and the traveling operation, the capacitor temperature is less than or equal to Ts, and the warming-up of the hydraulic drive system is performed based on the detection value of the ejection pressure sensor 29A. This condition corresponds to the condition in which the warming-up of the power storage system 120 starts when the warming-up of the hydraulic drive system is performed by the operating person. In addition, the controller 30 may start the warming-up of the power storage system 120 in a case where it is determined that the operating person does not perform the swiveling operation and the traveling operation, the cooling-water temperature is less than or equal to a predetermined warming-up start cooling-water temperature, and the warming-up of the hydraulic drive system is performed based on the detection value of the ejection pressure sensor 29A.

Specifically, the controller 30 determines that the warming-up of the hydraulic drive system is performed in a relief state where an ejection pressure (first pump pressure) of the main pump 14L detected by an ejection pressure sensor 29AL (refer to FIG. 15) becomes approximately a relief pressure, that is, in a case where the open state of the relief valve 50L is continued over a predetermined time tr. Alternatively, the controller 30 determines that the warming-up of the hydraulic drive system is performed in a relief state where an ejection pressure (second pump pressure) of the main pump 14R detected by an ejection pressure sensor 29AR (refer to FIG. 15) becomes approximately a relief pressure, that is, in a case where the open state of the relief valve 50R is continued for a predetermined time tr. In addition, the predetermined time tr is used to distinguish a relief state generated by excavation operation or the like and a relief state for performing the warming-up of the hydraulic drive system.

Figure 17:
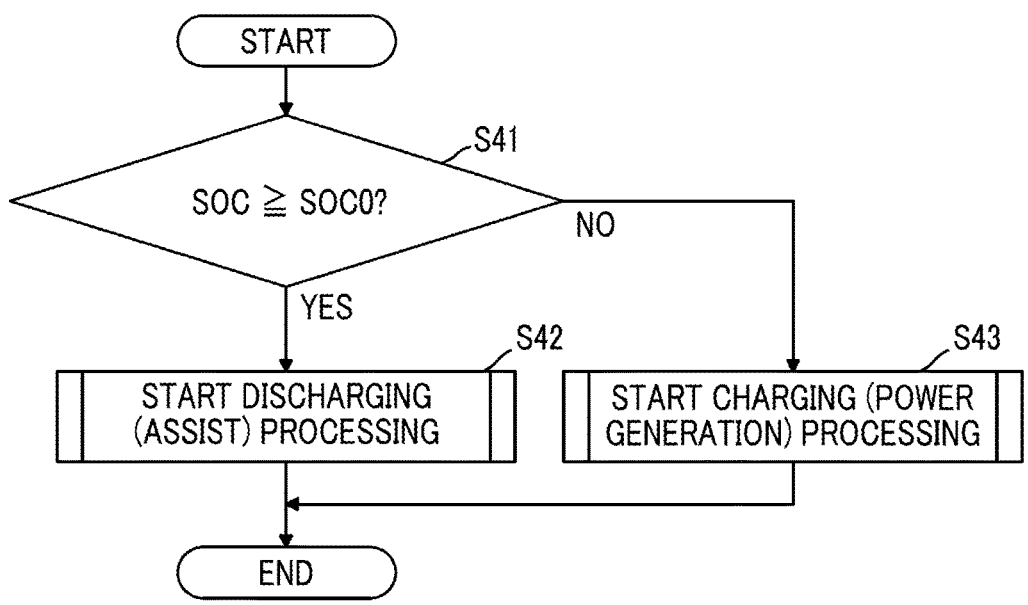
FIG. 17 is a flowchart showing a flow of power storage system warming-up processing.

Next, with reference to FIG. 17, processing (hereinafter, referred to as "power storage system warming-up processing") for the controller 30 performing warming-up on the power storage system 120 will be described. FIG. 17 is a flowchart showing the flow of the power storage system warming-up processing. In a case where the warming-up start conditions of the power storage system 120 are satisfied, the controller 30 repeatedly performs the power storage system warming-up processing at a predetermined control period until warming-up stop conditions (described below) of the power storage system 120 are satisfied.

Specifically, the controller 30 derives a state-of-charge (SOC) of the capacitor 19 using known methods, and determines whether or not the SOC of the capacitor 19 is equal to or more than a predetermined discharging (assist)/charging (power generation) start determination state-of-charge (SOC0) (Step S41).

In a case where it is determined that the SOC is equal to or more than the SOC0 (YES in Step S41), the controller 30 starts the discharging (assist) processing (Step S42).

In addition, in a case where it is determined that the SOC is less than the SOC0 (YES in Step S41), the controller 30 starts the charging (power generation) processing (Step S43).

Figure 18:
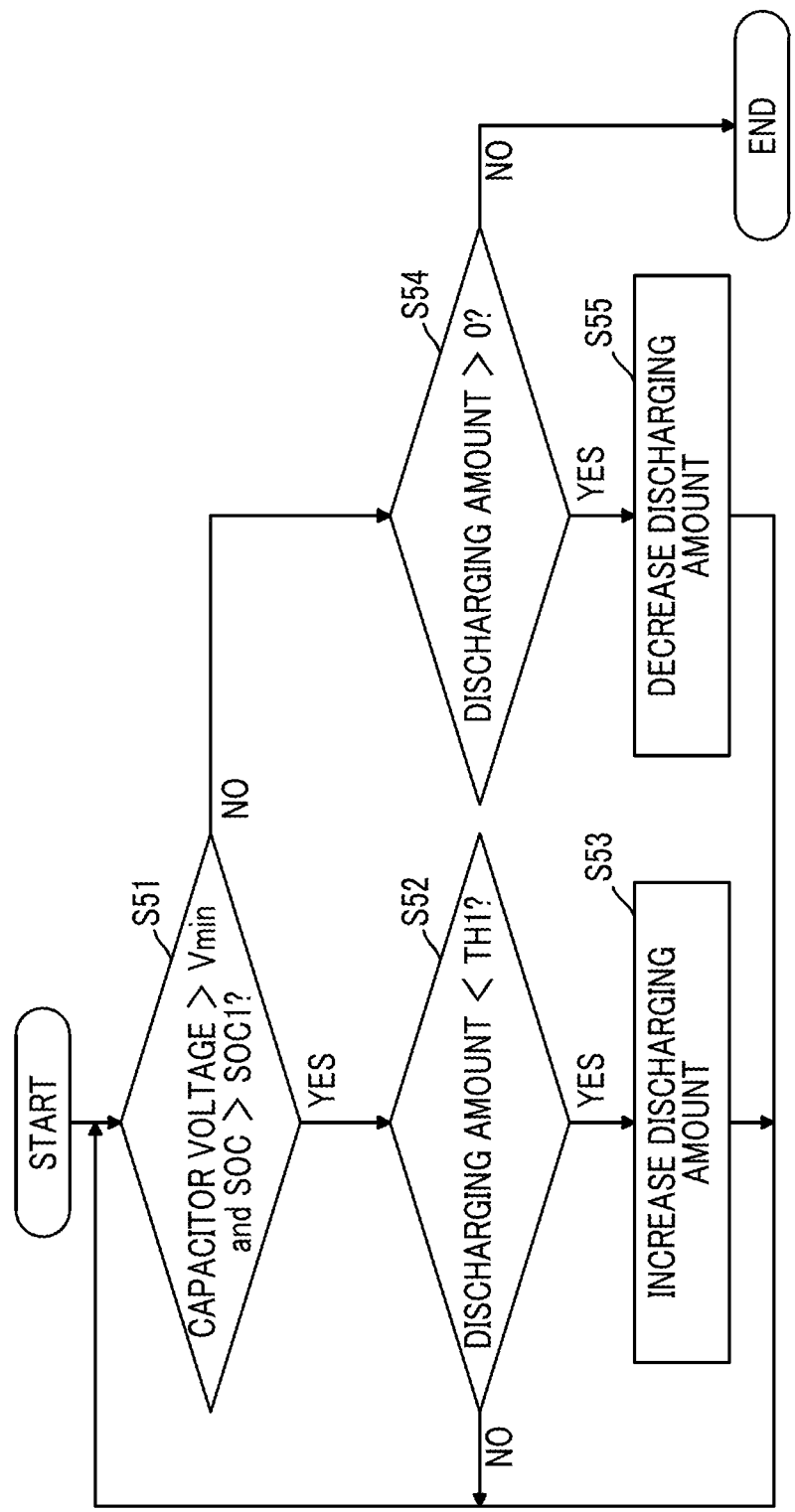
FIG. 18 is a flowchart showing a flow of discharging (assist) processing.

FIG. 18 is a flowchart showing the flow of the discharging (assist) processing. When the discharging (assist) processing is performed, the controller 30 operates the motor generator 12 as an electric motor by the power discharged from the capacitor 19.

Specifically, the controller 30 determines whether or not the capacitor voltage is higher than a predetermined lower limit voltage (Vmin) and the SOC of the capacitor 19 is higher than a predetermined charging transfer start state-of-charge (SOC1) (Step S51). The Vmin is a value which is preset to prevent the overdischarging of the capacitor 19. The SOC1 is a value which is preset as the SOC suitable for starting the transfer from the discharging state to the charging state. In the present embodiment, the SOC1 is set in stages to increase as the capacitor temperature decreases.

In a case where it is determined that the capacitor voltage is higher than the Vmin and the SOC is higher than the SOC1 (YES in Step S51), the controller 30 determines whether or not discharging amount is less than a predetermined threshold value TH1 (Step S52). The discharging amount is electric energy which is discharged per unit time, and in the present embodiment, is represented by power [kW]. Moreover, in the present embodiment, the controller 30 derives the discharging amount based on the detection values of the capacitor voltage detecting unit 112 and the capacitor current detecting unit 113.

In a case where it is determined that the discharging amount is less than the threshold value TH1 (YES in Step S52), the controller 30 increases the discharging amount (Step S53). In the present embodiment, the controller 30 returns the processing to Step S51 after increasing the discharging amount at a predetermined increase rate [kW/s].

In addition, in a case where it is determined that the discharging amount is equal to or more than the threshold value TH1 (NO in Step S52), the controller 30 returns the processing to Step S51 without increasing the discharging amount.

Meanwhile, in a case where it is determined that the capacitor voltage is less than or equal to the Vmin or the SOC is less than or equal to the SOC1 (NO in Step S51), the controller 30 determines the discharging amount is greater than zero (Step S54).

In a case where it is determined that the discharging amount is greater than zero (YES in Step S54), that is, in a case where it is determined that the capacitor is being discharged, the controller 30 decrease the discharging amount (Step S55). In the present embodiment, the controller 30 returns the processing to Step S51 after decreasing the discharging amount at a predetermined decrease rate.

In addition, in a case where it is determined that the discharging amount is zero (NO in Step S54), that is, in a case where it is determined that the discharge ends, the controller 30 ends the discharging (assist) processing and starts the charging (power generation) processing.

Figure 19:
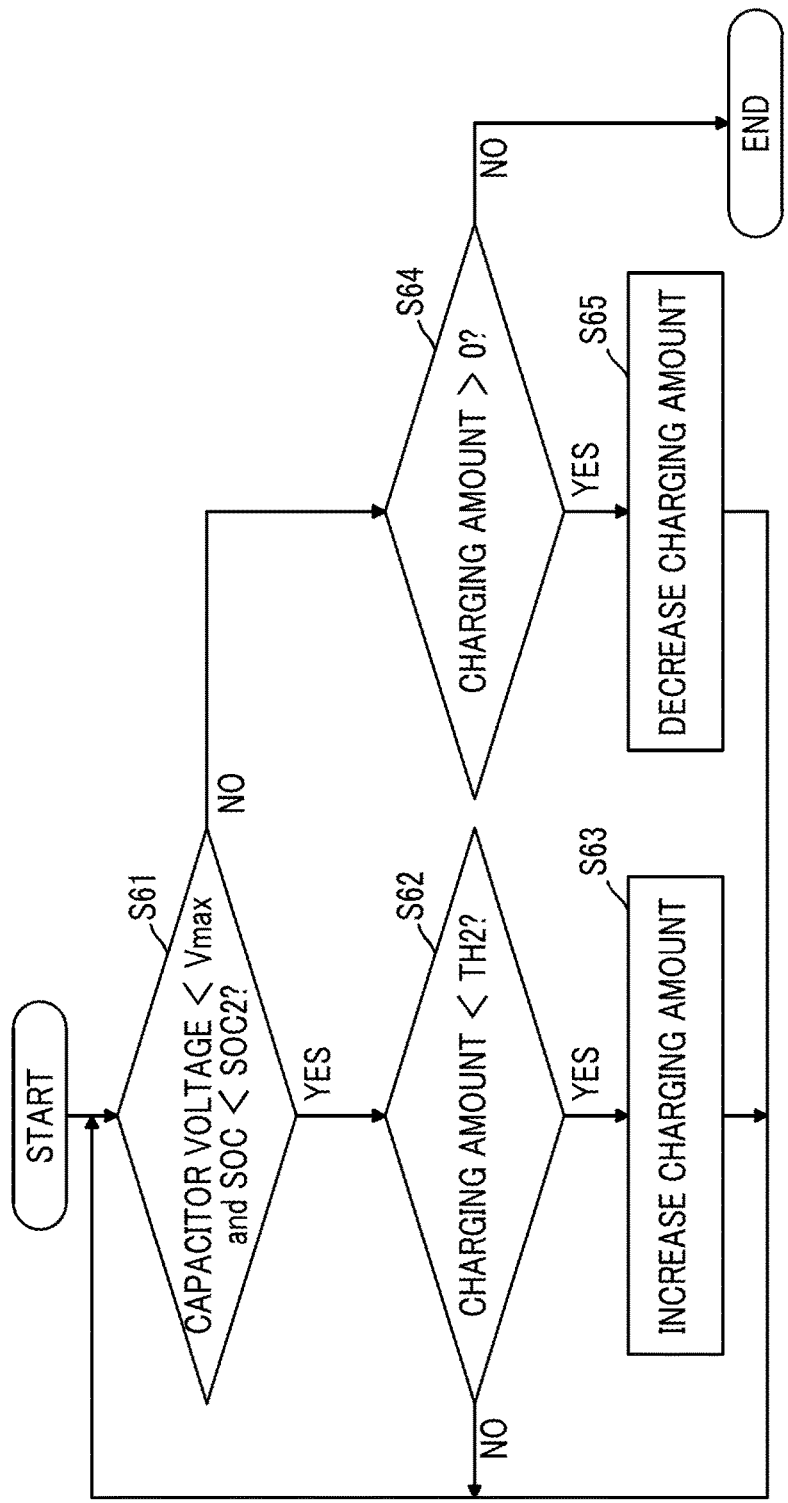
FIG. 19 is a flowchart showing a flow of charging (power generation) processing.

FIG. 19 is a flowchart showing the flow of the charging (power generation) processing. When the charging (power generation) processing is performed, the controller 30 charge the capacitor 19 using the power which is generated by the motor generator 12 which is driven as a generator by the engine 11.

Specifically, the controller 30 determines whether or not the capacitor voltage is lower than a predetermined upper limit voltage (Vmax) and the SOC of the capacitor 19 is lower than a predetermined discharge transfer start state-of-charge (SOC2) (Step S61). The Vmax is a value which is preset to prevent the overcharging of the capacitor 19. The SOC2 is a value which is preset as the SOC suitable for starting the transfer from the charge state to the discharge state. In the present embodiment, the SOC2 is set in stages to decrease as the capacitor temperature decreases.

In a case where it is determined that the capacitor voltage is lower than the Vmax and the SOC is lower than the SOC2 (YES in Step S61), the controller 30 determines whether or not charging amount is less than a predetermined threshold value TH2 (Step S62). The discharging amount is electric energy which is charged per unit time, and in the present embodiment, is represented by power [kW]. Moreover, in the present embodiment, the controller 30 derives the charging amount based on the detection values of the capacitor voltage detecting unit 112 and the capacitor current detecting unit 113.

In a case where it is determined that the charging amount is less than the threshold value TH2 (YES in Step S62), the controller 30 increases the charging amount (Step S63). In the present embodiment, the controller 30 returns the processing to Step S61 after increasing the charging amount at a predetermined increase rate [kW/s].

In addition, in a case where it is determined that the charging amount is equal to or more than the threshold value TH2 (NO in Step S62), the controller 30 returns the processing to Step S61 without increasing the charging amount.

Meanwhile, in a case where it is determined that the capacitor voltage is equal to or more than the Vmax or the SOC is equal to or more than the SOC2 (NO in Step S61), the controller 30 determines the charging amount is greater than zero (Step S64).

In a case where it is determined that the discharging amount is greater than zero (YES in Step S64), that is, in a case where it is determined that the capacity is being charged, the controller 30 decrease the charging amount (Step S65). In the present embodiment, the controller 30 returns the processing to Step S61 after decreasing the charging amount at a predetermined decrease rate.

In addition, in a case where it is determined that the charging amount is zero (NO in Step S64), that is, in a case where it is determined that the charging ends, the controller 30 ends the charging (power generation) processing and starts the discharging (assist) processing.

In this way, the controller 30 alternately repeats the charging (power generation) processing and the discharging (assist) processing until the warming-up stop conditions (described below) of the power storage system 120 is satisfied, and warms-up the capacitor 19 by self-heating due to an internal resistance of the capacitor 19 according to the charging and discharging of the capacitor 19 interlocked with the motor generator 12.

Figure 20:
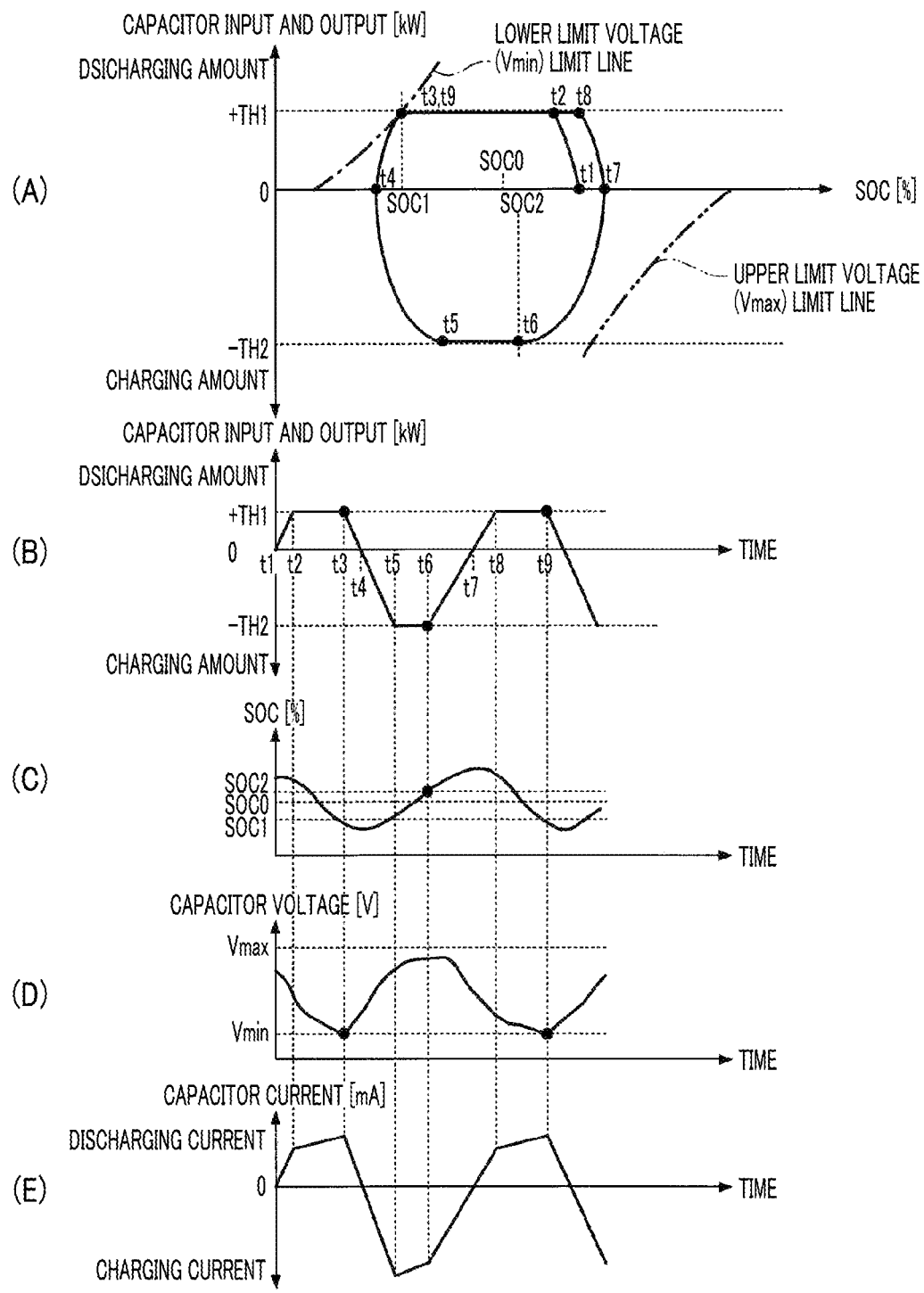
FIG. 20 is a diagram showing transitions of capacitor input/output, the SOC, a capacitor voltage, and a capacitor current.

Next, with reference to FIG. 20, transitions of various parameters during the power storage system warming-up processing will be described. In addition, FIG. 20 is a diagram showing transitions of capacitor input/out, the SOC, the capacitor voltage, and the capacitor current. The capacitor input/output is electric energy which is input into and output from the capacitor 19 per unit time, and in the present embodiment, is represented by power [kW]. In addition, a positive value of the capacitor input/output is equivalent to the discharging amount of the capacitor 19, and a negative value of the capacitor input/output is equivalent to the charging amount of the capacitor 19.

Specifically, (A) of FIG. 20 is a diagram showing a relationship between the capacitor input/output and the SOC, and here, the capacitor input/output is disposed at a vertical axis, and the SOC of the capacitor 19 is disposed at a horizontal axis. Moreover, (B) of FIG. 20 is a diagram showing a temporal transition of the capacitor input/output, and (C) of FIG. 20 is a temporal transition of the SOC. In addition, (D) of FIG. 20 is a diagram showing a temporal transition of the capacitor voltage, and (E) of FIG. 20 is a diagram showing a temporal transition of the capacitor current. Moreover, in (B) to (E) of FIG. 20, the time axes are common.

If the power storage system warming-up processing starts at time t1, the controller 30 determines whether or not the SOC of the capacitor 19 is equal to or more than the SOC0, and performs the discharging (assist) processing.

In addition, the controller 30 determines that the capacitor voltage is greater than the Vmin and the SOC is greater than the SOC1, determines that the discharging amount is smaller than the threshold value TH1, and increases the discharging amount at a predetermined increase rate.

Thereafter, if the discharging amount reaches the threshold value TH1 at time t2, the controller 30 stops the increase of the discharging amount, and continues the discharging from the capacitor 19 in state where the discharging amount is maintained at TH1.

Thereafter, if the capacitor voltage reaches the Vmin at time t3, the controller 30 starts the transfer from the discharging to the charging. Specifically, the controller 30 decreases the discharging amount at a predetermined decrease rate.

Thereafter, if the discharging amount reaches zero at time t4, the controller 30 ends the discharging (assist) processing. In addition, the controller 30 determines that the SOC of the capacitor 19 is less than the SOC0 and performs the charging (power generation) processing.

In addition, the controller 30 determines that the capacitor voltage is smaller than the Vmax and the SOC is smaller than the SOC2, determines that the charging amount (absolute value) is smaller than the threshold value TH2 (absolute value), and increases the charging amount (absolute value) at a predetermined increase rate. Moreover, hereinafter, the charging amount and the threshold value TH2 are represented by absolute values.

Thereafter, if the charging amount reaches the threshold value TH2 at time t5, the controller 30 stops the increase of the charging amount, and continues the charge with respect to the capacitor 19 in state where the charging amount is maintained at TH2.

Thereafter, if the SOC reaches the SOC2 at time t6, the controller 30 starts the transfer from the charging to the discharging. Specifically, the controller 30 decreases the charging amount at a predetermined decrease rate.

Thereafter, if the charging amount reaches zero at time t7, the controller 30 ends the charging (power generation) processing. In addition, the controller 30 determines that the SOC of the capacitor 19 is equal to or more than the SOC0 and performs the discharging (assist) processing again.

In addition, the controller 30 determines that the capacitor voltage is greater than the Vmin and the SOC is greater than the SOC1, determines that the discharging amount is smaller than the threshold value TH1, and increases the discharging amount at a predetermined increase rate.

Thereafter, if the discharging amount reaches the threshold value TH1 at time t8, the controller 30 stops the increase of the discharging amount, and continues the discharging from the capacitor 19 in a state where the discharging amount is maintained at TH1.

Thereafter, if the capacitor voltage reaches the Vmin or the SOC reaches the SOC1 at time t9, the controller 30 starts the transfer from the discharging to the charging.

In this way, the controller 30 alternately repeats the charging (power generation) processing and the discharging (assist) processing until the warming-up stop conditions (described below) of the power storage system 120 is satisfied, and warms-up the capacitor 19 by self-heating due to the internal resistance of the capacitor 19 according to the charging and discharging of the capacitor 19 interlocked with the motor generator 12.

Figure 21:
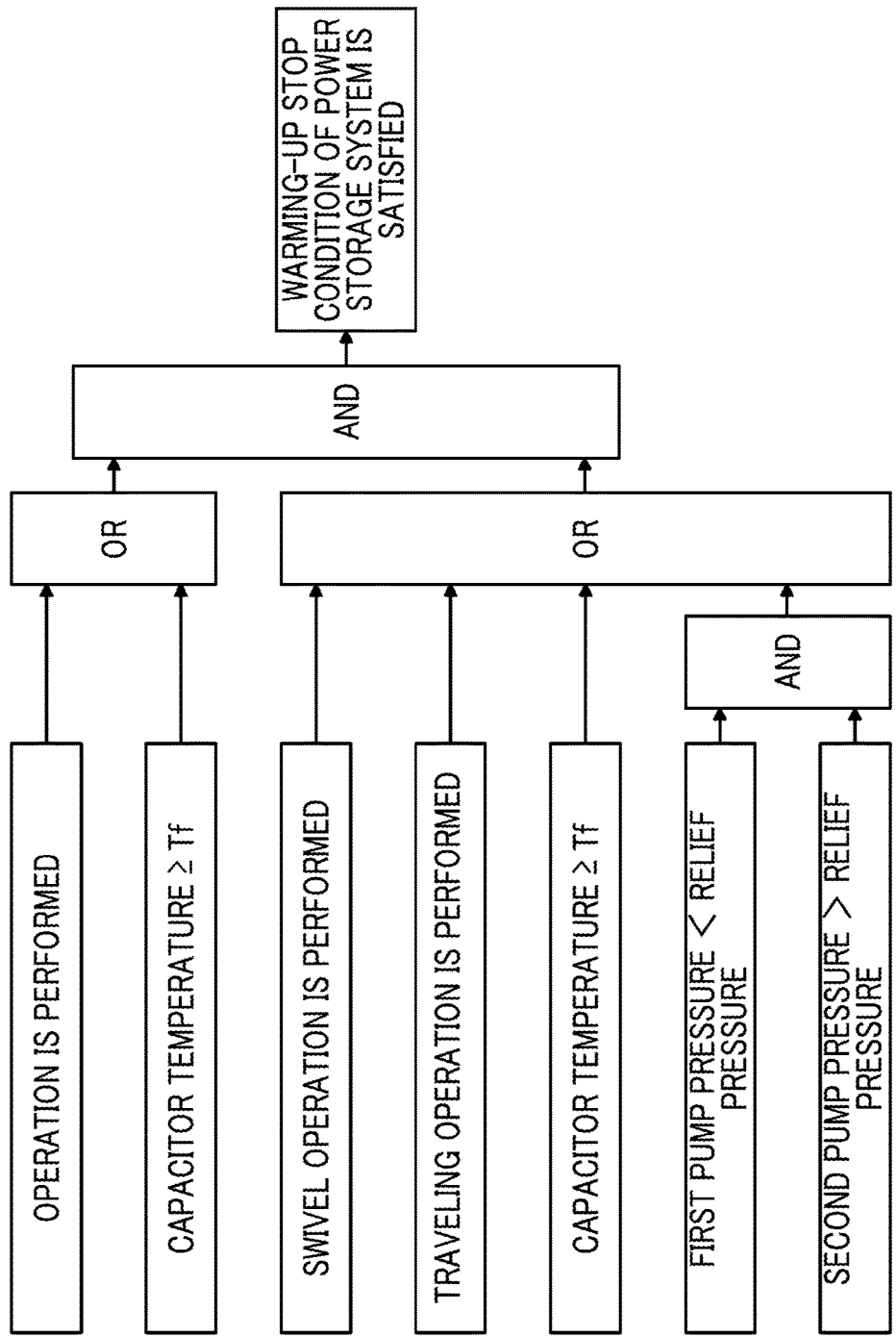
FIG. 21 is a diagram explaining warming-up stop conditions of the power storage system.

Next, with reference to FIG. 21, the warming-up stop conditions of the power storage system 120 will be described. In addition, similarly to the warming-up start conditions, the warming-up stop conditions of the power storage system 120 include conditions that the warming-up of the power storage system 120 stops when the shovel is in an idling state, and conditions that the warming-up of the power storage system 120 stops when the operating person performs the warming-up of the hydraulic drive system.

Specifically, the controller 30 stops the warming-up of the power storage system 120 in cases where the operating person operates the operation device 26 and the capacitor temperature is equal to or more than a predetermined warming-up stop capacitor temperature Tf. This condition corresponds to the condition that the warming-up of the power storage system 120 stops when the shovel is an idling state. In addition, the reason why the controller 30 stops the warming-up of the power storage system 120 in the case where the operation device 26 is operated even when the warming-up of the power storage system 120 is performed during the warming-up of the hydraulic drive system is as follows. That is, the reason is because it is not possible to determine whether the operation is the operation for starting the warming-up of the hydraulic drive system or the general operation for performing excavation or the like in the time when the operation device 26 is operated. Moreover, the capacitor temperature may be indirectly detected by detecting a temperature of a cooling water used so as to cool the capacitor 19. Alternatively, when the shovel is in an idling state, the controller 30 may stop the warming-up of the power storage system 120 in a case where the cooling-water temperature is equal to or more than a predetermined warming-up stop cooling-water temperature.

In addition, the controller 30 stops the warming-up of the power storage system 120 in a case where it is determined that the operating person performs the swiveling operation and the traveling operation, the capacitor temperature is equal to or more than Tf, and the warming-up of the hydraulic drive system is not performed based on the detection value of the ejection pressure sensor 29A. This condition corresponds to the condition that the warming-up of the power storage system 120 stops when the warming-up of the hydraulic drive system is performed by the operating person. In addition, even when the operating person performs the warming-up on the hydraulic drive system, the controller 30 may stop the warming-up of the power storage system 120 in a case where the cooling-water temperature is equal to or more than the warming-up stop cooling-water temperature.

Specifically, the controller 30 determines that the warming-up of the hydraulic drive system is not performed in a non-relief state where the ejection pressure (first pump pressure) of the main pump 14L is less than the relief pressure, that is, in a case where the relief valve 50L is in the closed state. Alternatively, the controller 30 determines that the warming-up of the hydraulic drive system is not performed in a non-relief state where the ejection pressure (second pump pressure) of the main pump 14R is lower than the relief pressure, that is, in a case where the relief valve 50R is in the closed state.

Moreover, in a case where the warming-up of the power storage system 120 stops before the capacitor temperature become Tf or more, the controller 30 limits the movement of the shovel (for example, swiveling electric motor 21) according to the capacitor temperature. This limitation is performed to prevent the charging and discharging of the power storage system 120 from being performed without limitation in a state where the warming-up of the power storage system 120 is not sufficient. For example, if the capacitor 19 is used in a state where the temperature thereof is low, the internal resistance of the capacitor 19 increases, the capacitor voltage exceeds the upper limit voltage Vmax or is lower than the lower limit voltage Vmin, and there is a concern that the capacitor 19 may deteriorate or may be damaged.

Figure 22:
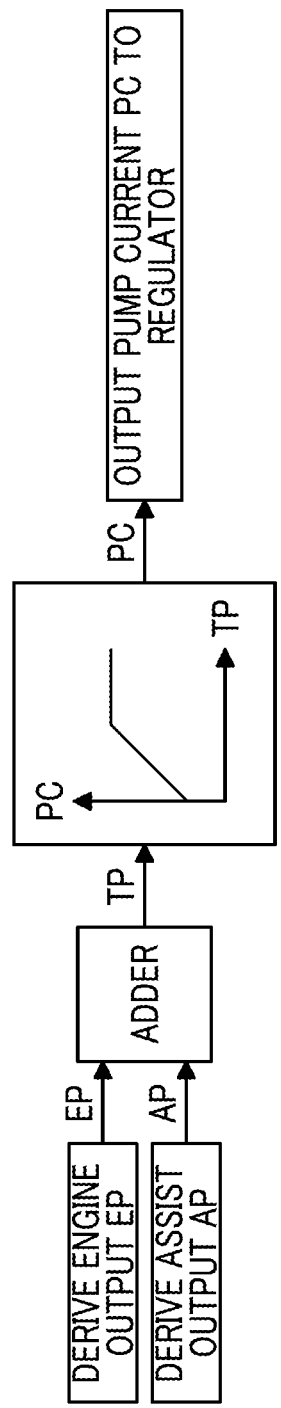
FIG. 22 is a conceptual diagram explaining absorption horsepower increasing and decreasing processing.

Next, with reference to FIG. 22, processing (hereinafter, referred to as "absorption horsepower increasing and decreasing processing") for the controller 30 increasing and decreasing the absorption horsepower of the main pump 14 in the case where the warming-up of the power storage system 120 is performed when the warming-up of the hydraulic drive system is performed will be described. In addition, FIG. 22 is a conceptual diagram explaining the absorption horsepower increasing and decreasing processing. Moreover, in the present embodiment, the absorption horsepower of the main pump 14 is calculated by the product of the ejection amount and the ejection pressure of the main pump 14.

Specifically, the controller 30 drives the engine output EP. In the present embodiment, the controller 30 receives a detection value of an engine rotating speed sensor (not shown), and derives the engine output EP with reference to an engine rotating speed/engine output correspondence map is stored in an internal memory in advance.

In addition, the controller 30 derives the assist output AP. In the present embodiment, the controller 30 derives the power transmitted and received between the motor generator 12 and the capacitor 19 as the assist output AP, based on the detection values of the capacitor voltage detecting unit 112 and the capacitor current detecting unit 113. In addition, the assist output AP becomes a positive value in the case where the motor generator 12 functions as an electric motor (in the case where the capacitor 19 is discharged), and the assist output AP becomes a negative value in the case where the motor generator 12 function as a generator (in the case where the capacitor 19 is charged).

Thereafter, the controller 30 adds the engine output EP and the assist output AP to derive the total output TP. The total output TP becomes a value which is greater by the assist output AP than the engine output EP in the case where the motor generator 12 functions as an electric motor (in the case where the capacitor 19 is discharged), and the total output TP becomes a value which is smaller by the assist output AP than the engine output EP in the case where the motor generator 12 functions as a generator (in the case where the capacitor 19 is charged).

Thereafter, the controller 30 derives the pump current PC. In the present embodiment, the controller 30 receives the detection value of the engine rotating speed sensor, and derives the pump current PC with reference to the total output/pump current correspondence map corresponding to the engine rotating speed which is stored in the internal memory in advance.

Thereafter, the controller 30 outputs the pump current PC to the regulator 14a. In the present embodiment, the regulator 14a decreases the ejection amount of the main pump 14 as the pump current PC decreases.

Accordingly, if the engine output EP is constant, the controller 30 decreases the pump current PC and the absorption horsepower of the main pump 14 as the assist output AP decreases. That is, if the engine rotating speed is constant, the controller 30 decreases the pump current PC and the absorption horsepower of the main pump 14 as the electric power generation (charging amount of the capacitor 19) of the motor generator 12 increases. The total output TP decreases as the assist output AP decreases, and if the absorption horsepower of the main pump 14 decreases, there is a concern that the absorption horsepower may exceed the total output TP.

On the other hand, if the engine output EP is constant, the controller 30 increases the pump current PC and the absorption horsepower of the main pump 14 as the assist output increases. That is, if the engine rotating speed is constant, the controller 30 increases the pump current PC and the absorption horsepower of the main pump 14 as the power consumption (discharging amount of the capacitor 19) of the motor generator 12 increases. The total output TP increases as the assist output AP increases, and since there are allowances in the total output TP, the main pump 14 can effectively use the allowances.

Figure 23:
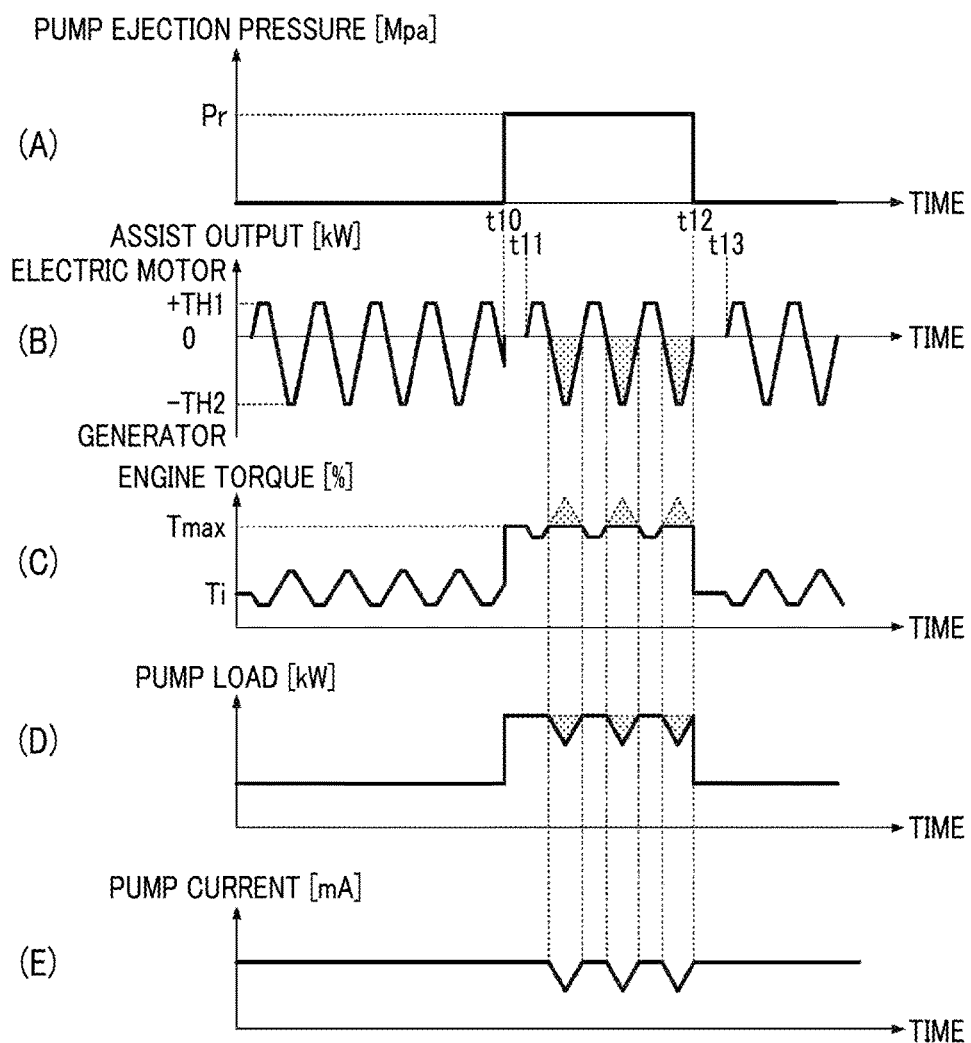
FIG. 23 is a diagram showing an example of a temporal transition of various parameters during the power storage system warming-up processing.

Next, with reference to FIG. 23, temporal transitions of various parameters during the power storage system warming-up processing will be described. In addition, FIG. 23 shows temporal transitions of a pump ejection pressure, an assist output, engine torque, a pump load, and a pump current, and here, time axes are common. In the present embodiment, the pump ejection pressure is the ejection pressure of the main pump 14R. In addition, the assist output is the value corresponding to the above-described assist output AP, and the engine torque is the value corresponding to the above-described engine output EP. Moreover, the pump load is the absorption horsepower of the main pump 14R, and the pump current is the value which is output from the controller 30 to the regulator 14aR (refer to FIG. 15).

As shown in (A) of FIG. 23, since the warming-up of the hydraulic drive system is not performed before time t10, the pump ejection pressure transits to a relatively low value. In addition, the pump ejection pressure increases to a relief pressure Pr if the warming-up of the hydraulic drive system starts at the time t10, and the transition where the pump ejection pressure is the relief pressure Pr is maintained until the warming-up of the hydraulic drive system stops at time t12. Moreover, after the warming-up of the hydraulic drive system stops at the time t12, the pump ejection pressure transits the level before the warming-up of the hydraulic drive system starts.

As shown in (B) of FIG. 23, since the warming-up of the power storage system 120 is performed before the time t10, the assist output repeatedly increases and decreases after exceeding zero. In addition, if the warming-up of the hydraulic drive system starts at the time t10, the assist output becomes zero. This is because the bucket 6 is operated to start the warming-up of the hydraulic drive system, and as a result, the warming-up stop conditions of the power storage system 120 are satisfied, and the controller 30 stops the warming-up of the power storage system 120. Specifically, this is because the controller 30 stops the charging and discharging of the capacitor 19, operations of the motor generator 12 as an electric motor or a generator.

Thereafter, the assist output repeatedly increases and decreases again after exceeding zero at time t11. This is because a relief state in which the pump ejection pressure becomes approximately a relief pressure is continued over a predetermined time tr, and as a result, the warming-up of the hydraulic drive system is performed, and the controller 30 starts the warming-up of the power storage system 120. Specifically, this is because the controller 30 starts the charging and discharging of the capacitor 19, operations of the motor generator 12 as an electric motor or a generator.

Thereafter, the assist output becomes zero again at time t12. This is because the pump ejection pressure is less than the relief pressure Pr, and as a result, the warming-up of the hydraulic drive system stops, and the controller 30 stops the warming-up of the power storage system 120.

Thereafter, the assist output repeatedly increases and decreases again after exceeding zero at time t13. This is because the state in which the operation device 26 is not operated over a predetermined time is continued, and as a result, the warming-up start conditions are satisfied, and the controller 30 starts the warming-up of the power storage system 120.

As shown in (C) of FIG. 23, since the warming-up of the hydraulic drive system is not performed before the time t10, the engine torque repeatedly increase and decreases with torque Ti at the time of idling as a center according to the increase and decrease of the assist output. In addition, the engine torque becomes the allowable maximum torque Tmax if the warming-up of the hydraulic drive system starts at the time t10. This is because the pump ejection pressure reaches the relief pressure to perform the warming-up of the hydraulic drive system, and as a result, the pump load increases.

Thereafter, the transition in which the engine torque is Tmax is maintained except for periods when the assist output has positive values. In the periods when the assist output has positive values, the engine torque decreases according to the increase of the assist output. The reason why the engine torque decreases for the periods when the assist output has positive values because the engine 11 is assisted by the motor generator 12 which functions as an engine motor and the engine load decreases. Meanwhile, the transition in which the engine torque is Tmax is maintained for periods when the assist output has negative values. This is because the increase of the engine load (engine torque) generated by allowing the motor generator 12 to function as a generator is cancelled by the decrease of the engine load (engine torque) generated by decreasing the pump load. Specifically, this is because the controller 30 decrease the pump current (refer to (E) of FIG. 23) according to variation in a negative region of the assist output (refer to (B) of FIG.

23B), and decreases the pump load (refer to (D) of FIG. 23) according to the decrease of the pump current.

In addition, a region of a coarse dot pattern in (C) of FIG. 23 indicates the increase of the engine load (engine torque) which has been required to operate the motor generator 12 as a generator in a case where the pump load was not decreased. In addition, a region of a coarse dot pattern in (B) of FIG. 23 indicates the electric power generation of the hydraulic drive system performed by the motor generator 12 during the warming-up of the hydraulic drive system, and corresponds to the increase of the engine torque indicated by the coarse dot pattern in (C) of FIG. 23. Moreover, a region of a coarse dot pattern in (D) of FIG. 23 indicates the decrease of the pump load, and corresponds to the increase of the engine torque indicated by the coarse dot pattern in (C) of FIG. 23.

Next, with reference to FIG. 24, still another example of the temporal transition of the various parameters during the power storage system warming-up processing will be described. In addition, in FIG. 24, the temporal transitions of the engine torque, the pump current, and the pump load are different from those of FIG. 23. However, the temporal transitions of other parameters are common with those of FIG. 23. Accordingly, descriptions with respect to the common portions are omitted, and portions different from each other will be described in detail.

Figure 24:
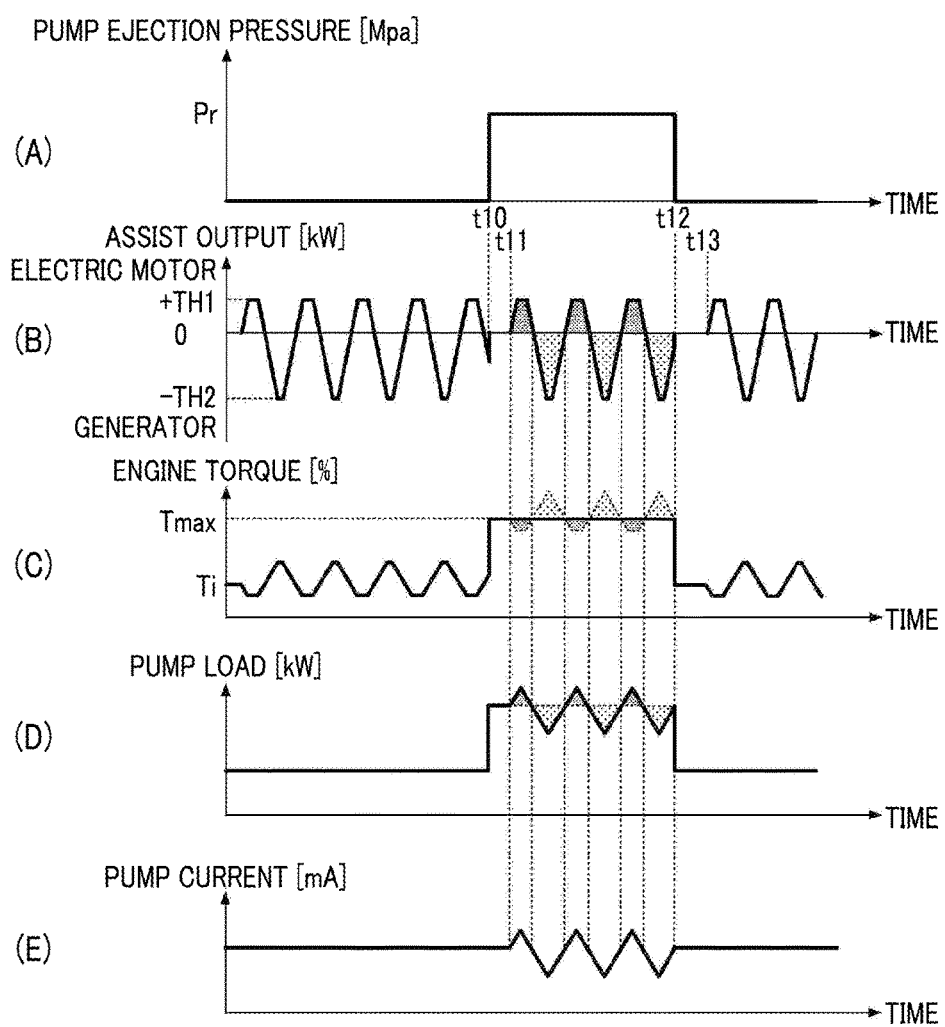
FIG. 24 is a diagram showing another example of a temporal transition of various parameters during the power storage system warming-up processing.

Unlike (C) of FIG. 23, in (C) of FIG. 24, in the engine torque during the warming-up of the hydraulic drive system, the transition in which the engine torque is Tmax is maintained regardless of the transition of the assist torque.

This because the decrease of the engine load (engine torque) generated by allowing the motor generator 12 to function as an electric motor is cancelled by the increase of the engine load (engine torque) generated by increasing the pump load for a period when the assist output becomes a positive value. Specifically, this is because the controller 30 increases the pump current (refer to (E) of FIG. 24) according to variation in a positive region of the assist output (refer to (B) of FIG. 24), and decreases the pump load (refer to (D) of FIG. 24) according to the increase of the pump current.

In addition, this because the increase of the engine load (engine torque) generated by allowing the motor generator 12 to function as a generator is cancelled by the increase of the engine load (engine torque) generated by decreasing the pump load for a period when the assist output becomes a negative value. Specifically, this is because the controller 30 decreases the pump current (refer to (E) of FIG. 24) according to variation in a negative region of the assist output (refer to (B) of FIG. 24), and decreases the pump load (refer to (D) of FIG. 24) according to the decrease of the pump current.

In addition, a region of a fine dot pattern in (C) of FIG. 24 indicates the decrease of the engine load (engine torque) which has been decreased by operating the motor generator 12 as an electric motor in a case where the pump load was not increased. In addition, a region of a fine dot pattern in (B) of FIG. 24 indicates power consumption of the motor generator 12 during the warming-up of the hydraulic drive system, and corresponds to the decrease of the engine torque indicated by the fine dot pattern in (C) of FIG. 24. Moreover, a region of a fine dot pattern in (D) of FIG. 24 indicates the increase of the pump load, and corresponds to the decrease of the engine torque indicated by the fine dot pattern in (C) of FIG. 24.

In addition, the regions of the coarse dot patterns in (B) to (D) of FIG. 24 have the similar means as that of the regions of the coarse dot patterns in (B) to (D) of FIG. 23.

According to the above-described configuration, the controller 30 can simultaneously perform the warming-up of the hydraulic drive system and the warming-up of the power storage system 120. As a result, the controller 30 can effectively perform the warming-up of the power storage system 120 and the warming-up of the hydraulic drive system, and can shorten the entire warming-up time. Moreover, the controller 30 may simultaneously perform the warming-up of the engine 11, the warming-up of the hydraulic drive system, and the warming-up of the power storage system 120. In addition, since the warming-up of the hydraulic drive system and the warming-up of the power storage system 120 is likely to increase the engine load, the warming-up of the hydraulic drive system and the warming-up of the power storage system 120 accelerate the warming-up of the engine 11.

Moreover, in the case where the motor generator 12 is operated as a generator to perform the warming-up of the power storage system 120 during the warming-up of the hydraulic drive system, the controller 30 decreases the absorption horsepower of the main pump 14. Accordingly, it is possible to prevent the sum of the absorption horsepower (the power generation load with respect to the engine 11) of the motor generator 12 and the absorption horsepower (the hydraulic load with respect to the engine 11) of the main pump 14 from exceeding an output horsepower of the engine 11. As a result, it is possible to prevent the engine rotating speed from decreasing or to prevent the engine 11 from stopping in the case where the warming-up of the power storage system 120 is performed during the warming-up of the hydraulic drive system.

In addition, in the case where the motor generator 12 is operated as an electric motor to perform the warming-up of the power storage system 120 during the warming-up of the hydraulic drive system, the controller 30 may increase the absorption horsepower of the main pump 14. Accordingly, it is possible to increase the absorption horsepower of the main pump 14 to the maximum within a range which does not exceed the output horsepower of the engine 11, and it is possible to further promote the warming-up of the hydraulic drive system. As a result, it is possible to further shorten the warming-up time of the hydraulic drive system.

Moreover, the controller 30 determines whether or not the hydraulic drive system is being warmed-up. In the above-described embodiment, in the case where the relief state in which the ejection pressure of the main pump 14 becomes approximately the relief pressure is continued over a predetermined time, the controller 30 determines that the hydraulic drive system is warmed-up. Accordingly, the controller 30 can determines whether the hydraulic drive system is warmed-up or performs work such as excavation with high reliability. As a result, it is possible to prevent the warming-up of the power storage system 120 from being performed during work such as excavation.

In addition, the controller 30 starts the warming-up of the power storage system 120 in the case where the predetermined warming-up start conditions are satisfied, and stops the warming-up of the power storage system 120 in the case where the predetermined warming-up stop conditions are satisfied. In the present embodiment, when it is determined that the hydraulic drive system is warmed-up, in the case where the capacitor temperature is less than or equal to the warming-up start capacitor temperature Ts, and the swiveling operation and the traveling operation are not performed, the controller 30 starts the warming-up of the power storage system 120. In addition, when it is determined that the hydraulic drive system is being warmed-up, in the case where the capacitor temperature is equal to or more than the warming-up stop capacitor temperature Tf or in the case where and the swiveling operation and the traveling operation are performed, the controller 30 stops the warming-up of the power storage system 120. As a result, it is possible to prevent the warming-up of the power storage system 120 from starting at an inappropriate timing or to prevent the warming-up of the power storage system 120 from stopping at an inappropriate timing.

Hereinbefore, preferred embodiments of the present invention are described in detail. However, the present invention is not limited to the above-described embodiments, and various modifications and replacements can be applied to the above-described embodiments without departing from the gist of the present invention.

For example, in the above-described embodiments, the charging transfer start state-of-charge (SOC1) is set in stages so as to increase as the capacitor temperature decreases, and the discharging transfer start state-of-charge (SOC2) is set in stages so as to decrease as the capacitor temperature decreases. However, the present invention is not limited to this configuration. For example, at least one of the SOC1 and the SOC2 may be set steplessly according to the capacitor temperature.

It should be understood that the invention is not limited to the above-described embodiment, but may be modified into various forms on the basis of the spirit of the invention. Additionally, the modifications are included in the scope of the invention.

What is claimed is:

1. A shovel comprising:
a lower travelling body;
an upper swivel body;
an operation attachment;
an engine;
a motor generator which is connected to the engine;
a hydraulic pump which is connected to the motor generator and supplies hydraulic oil to the operation attachment;
a swiveling electric motor which is mounted on the upper swivel body;
a power storage device;
a DC bus which electrically connects the power storage device and the swiveling electric motor to each other; and
a control device,
wherein the control device decreases a charging/discharging limit value of the power storage device and changes a discharging requirement value which is the maximum value of power which is supplied from the power storage device to the swiveling electric motor, according to a decrease of temperature.

2. The shovel according to claim 1, wherein the control device decreases a change of each of the charging limit value and the discharging limit value with respect to a change of a state-of-charge of the power storage device and decreases a change of the discharging requirement value with respect to the change of the state-of-charge, according to the decrease of temperature.

3. The shovel according to claim 1, wherein the control device decreases a discharging start state-of-charge according to the decrease of temperature.

4. The shovel according to claim 1, wherein the control device decreases a swivel speed limit value according to the decrease of temperature.

5. The shovel according to claim 4, wherein the control device decreases a swivel torque limit value according to a decrease of the swivel speed limit value.

6. The shovel according to claim 4, wherein the control device decreases an ejection amount of the hydraulic pump according to the decrease of the swivel speed limit value.

7. The shovel according to claim 1, wherein the control device decreases the discharging requirement value according to the decrease of temperature when swivel regeneration is performed.

8. The shovel according to claim 1, wherein the control device decreases the discharging requirement value according to the decrease of temperature when swiveling power runs.

9. The shovel according to claim 1, further comprising:
a hydraulic drive system which drives the operation attachment, and
wherein the control device charges and discharges the power storage device to warm up the power storage device during warming-up of the hydraulic drive system.

10. The shovel according to claim 9, wherein the control device decreases an absorption horsepower of the hydraulic pump which configures the hydraulic drive system in a case where the motor generator is operated as a generator during warming-up of the hydraulic drive system and warming-up of the power storage device.

11. The shovel according to claim 9, wherein the control device increases an absorption horsepower of the hydraulic pump which configures the hydraulic drive system in a case where the motor generator is operated as an electric motor during warming-up of the hydraulic drive system and warming-up of the power storage device.

12. The shovel according to claim 9, wherein the control device determines whether or not the hydraulic drive system is being warmed-up.

13. The shovel according to claim 9, wherein the control device starts warming-up of the power storage device in a case where a temperature related to the power storage device is less than or equal to a predetermined temperature, and a swiveling operation and a traveling operation are not performed.

14. The shovel according to claim 9, wherein the control device stops warming-up of the power storage device in a case where a temperature related to the power storage device is equal to or more than a predetermined temperature, or a swiveling operation or a traveling operation is performed.

* * * * *